(12) United States Patent
Fukumoto et al.

(10) Patent No.: US 11,293,905 B2
(45) Date of Patent: Apr. 5, 2022

(54) PHASED-ARRAY FLAW-DETECTION DEVICE AND METHOD

(71) Applicant: IHI Inspection and Instrumentation Co., Ltd., Tokyo (JP)

(72) Inventors: Shintaro Fukumoto, Yokohama (JP); Hiraku Kawasaki, Yokohama (JP); Takahiro Arakawa, Yokohama (JP)

(73) Assignee: IHI INSPECTION AND INSTRUMENTATION CO., LTD., Tokyo (JP)

( * ) Notice: Subject to any disclaimer, the term of this patent is extended or adjusted under 35 U.S.C. 154(b) by 124 days.

(21) Appl. No.: 16/619,342

(22) PCT Filed: Mar. 14, 2018

(86) PCT No.: PCT/JP2018/010047
§ 371 (c)(1),
(2) Date: Dec. 4, 2019

(87) PCT Pub. No.: WO2019/008833
PCT Pub. Date: Jan. 10, 2019

(65) Prior Publication Data
US 2020/0116672 A1 Apr. 16, 2020

(30) Foreign Application Priority Data
Jul. 3, 2017 (JP) .............................. JP2017-130126

(51) Int. Cl.
*G01N 29/26* (2006.01)
*G01N 29/24* (2006.01)

(52) U.S. Cl.
CPC ....... *G01N 29/2487* (2013.01); *G01N 29/262* (2013.01); *G01N 2291/106* (2013.01)

(58) Field of Classification Search
CPC ............ G01N 29/2487; G01N 29/225; G01N 29/262; G01N 29/043; G01N 29/11;
(Continued)

(56) References Cited

U.S. PATENT DOCUMENTS 5,103,129 A 4/1992 Slayton et al.
6,202,489 B1 3/2001 Beffy et al.
(Continued)

FOREIGN PATENT DOCUMENTS

DE 102011108730 A1 1/2013
EP 0468506 B1 7/1996
(Continued)

OTHER PUBLICATIONS

Japanese Office Action dated Jan. 22, 2021 for Japanese Patent Application No. 2019-528355.
(Continued)

*Primary Examiner* — Jacques M Saint Surin
(74) *Attorney, Agent, or Firm* — Volpe Koenig

(57) ABSTRACT

A plurality of ultrasonic transducers of the invented probe are separated in a concentric circle pattern, separated in rows that are orthogonal to a reference line L that passes through the center of circles, and positioned line symmetrically with respect to the reference line L. The detection surface of the invented probe has a circular shape having the diameter D, and has a plurality of segments divided into a plurality of arc-shaped portions that are symmetrical with respect to the reference line L. Further a controller which has a plurality of control channels for controlling pairs of the line symmetrical ultrasonic transducers under the same conditions is provided.

8 Claims, 22 Drawing Sheets

(58) Field of Classification Search
CPC ....... G01N 2291/044; G01N 2291/106; G01N 2291/2634; B06B 1/0625
USPC .......................................................... 73/584
See application file for complete search history.

(56) References Cited

U.S. PATENT DOCUMENTS

| | | | |
|---|---|---|---|
| 8,701,492 B2 | 4/2014 | Mizota et al. | |
| 9,335,302 B2* | 5/2016 | Oberdoerfer | G01N 29/4463 |
| 10,175,207 B2 | 1/2019 | Oberdoerfer et al. | |
| 2002/0139193 A1 | 10/2002 | Angelsen et al. | |
| 2003/0188582 A1 | 10/2003 | Amemiya | |
| 2006/0103267 A1 | 5/2006 | Lupien et al. | |
| 2006/0184035 A1* | 8/2006 | Kimura | A61B 8/12 |
| | | | 600/466 |
| 2009/0019937 A1* | 1/2009 | Deemer | G01N 29/262 |
| | | | 73/660 |
| 2009/0118619 A1* | 5/2009 | Oshiki | G01S 15/8925 |
| | | | 600/459 |
| 2011/0138919 A1* | 6/2011 | Falter | G01N 29/07 |
| | | | 73/597 |
| 2013/0080086 A1 | 3/2013 | Oberdoerfer | |
| 2014/0157903 A1 | 6/2014 | Oberdoerfer et al. | |
| 2018/0259489 A1* | 9/2018 | Bruch | G01N 29/225 |

FOREIGN PATENT DOCUMENTS

| | | |
|---|---|---|
| JP | 05-244691 A | 9/1993 |
| JP | 06-038298 A | 2/1994 |
| JP | 2001-286467 A | 10/2001 |
| JP | 2005-351718 A | 12/2005 |
| JP | 2009-105762 A | 5/2009 |
| JP | 2011-069780 A | 4/2011 |
| JP | 2016-501375 A | 1/2016 |

OTHER PUBLICATIONS

Extended European Search Report dated Jun. 29, 2020 for the European Patent Application No. 18828515.9.
International Search Report, PCT/JP2018/010047, dated Jun. 12, 2018, 2 pgs.
Japanese Office Action dated Jul. 3, 2020 for the Japanese Patent Application No. 2019-528355.
Indian Office Action dated Dec. 2, 2020 for Indian Patent Application No. 201947052030.
Singapore Search Report and Written Opinion dated Nov. 26, 2020 for Singapore Patent Application No. 11201911097U.

* cited by examiner

[Fig. 1]
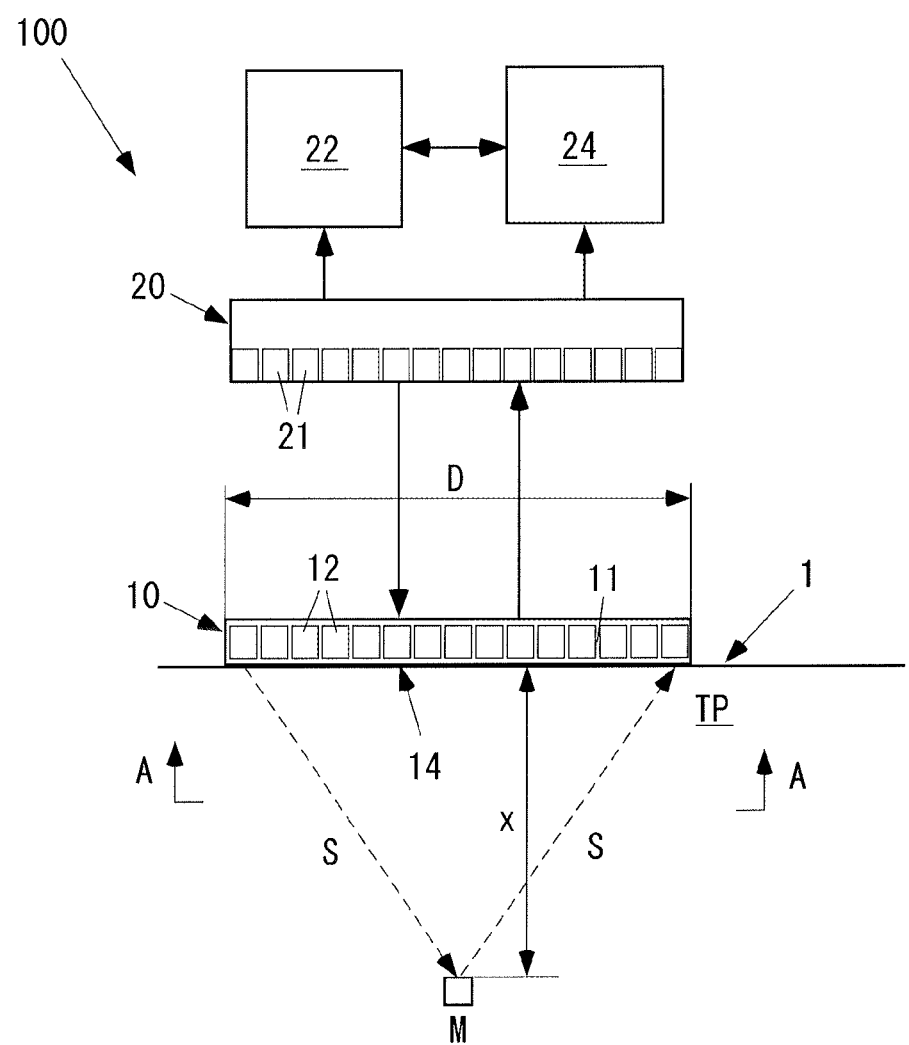

[Fig. 2]
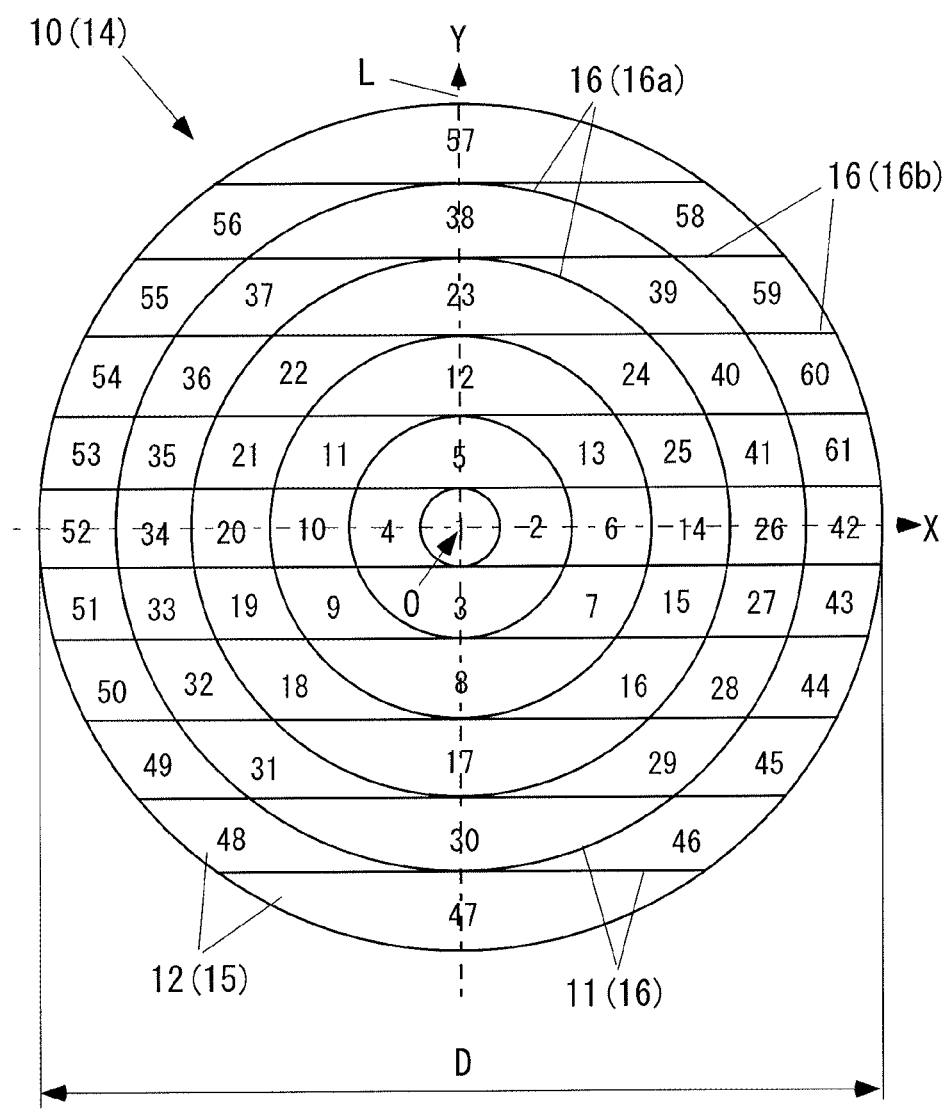

[Fig. 3]
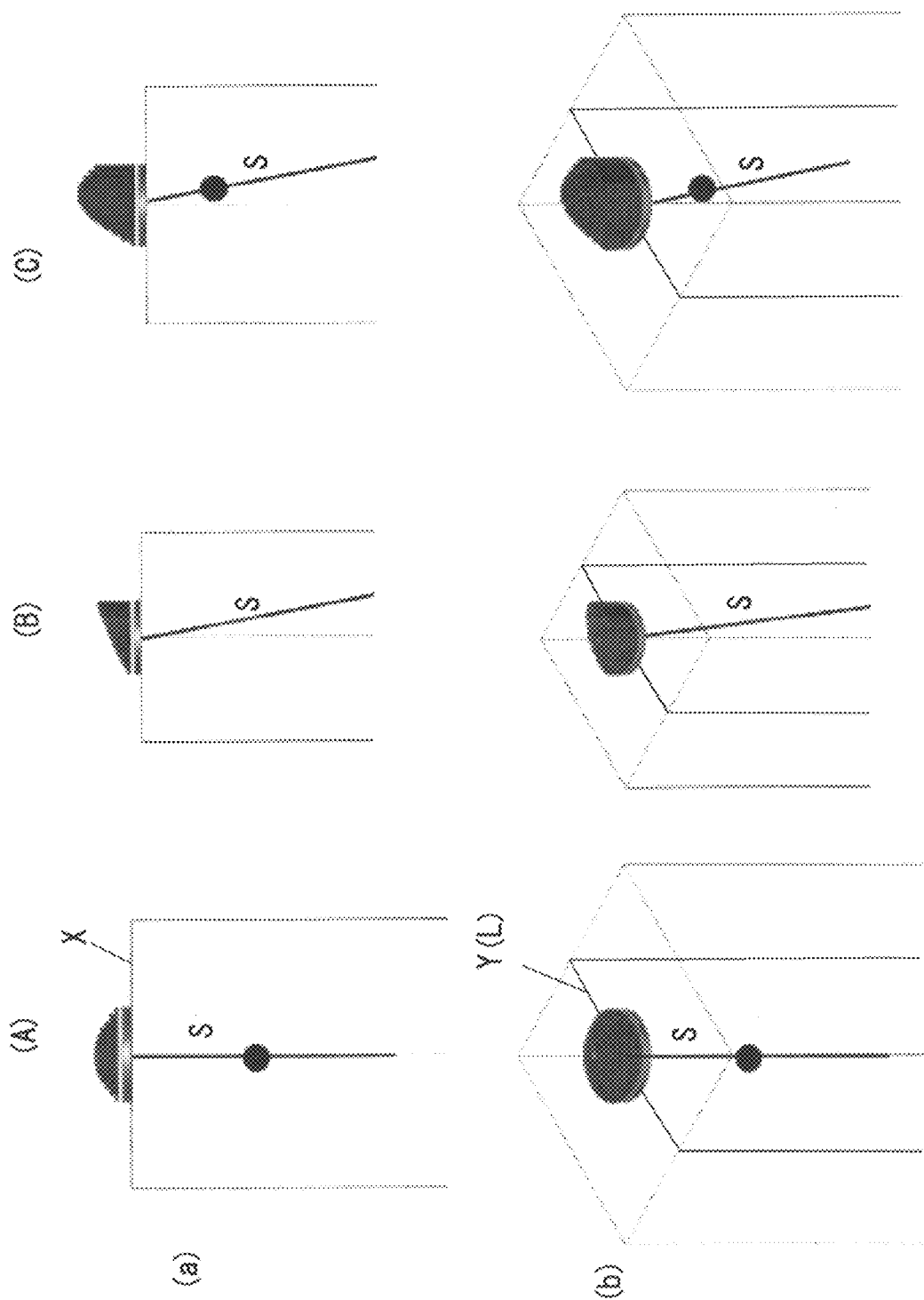

[Fig. 4]
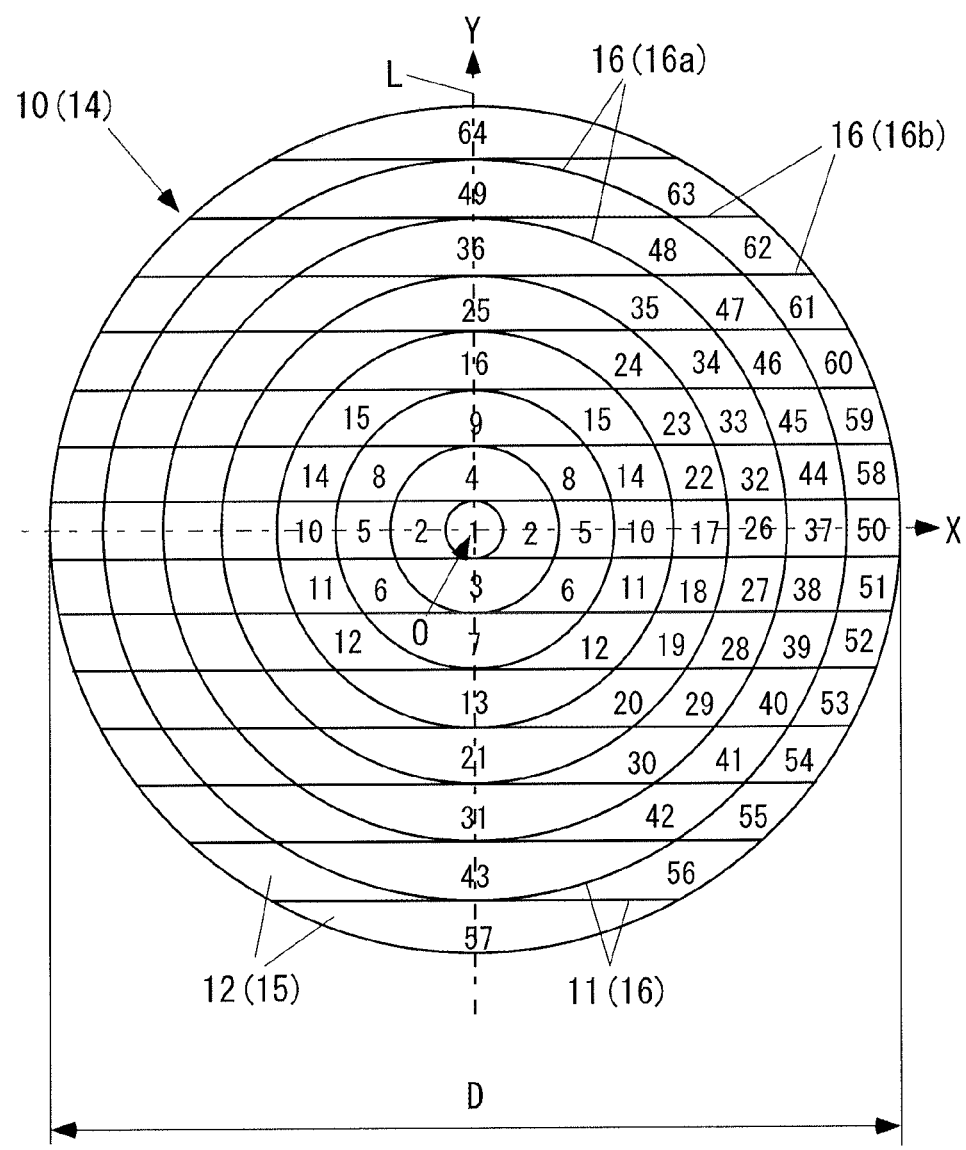

[Fig. 5]
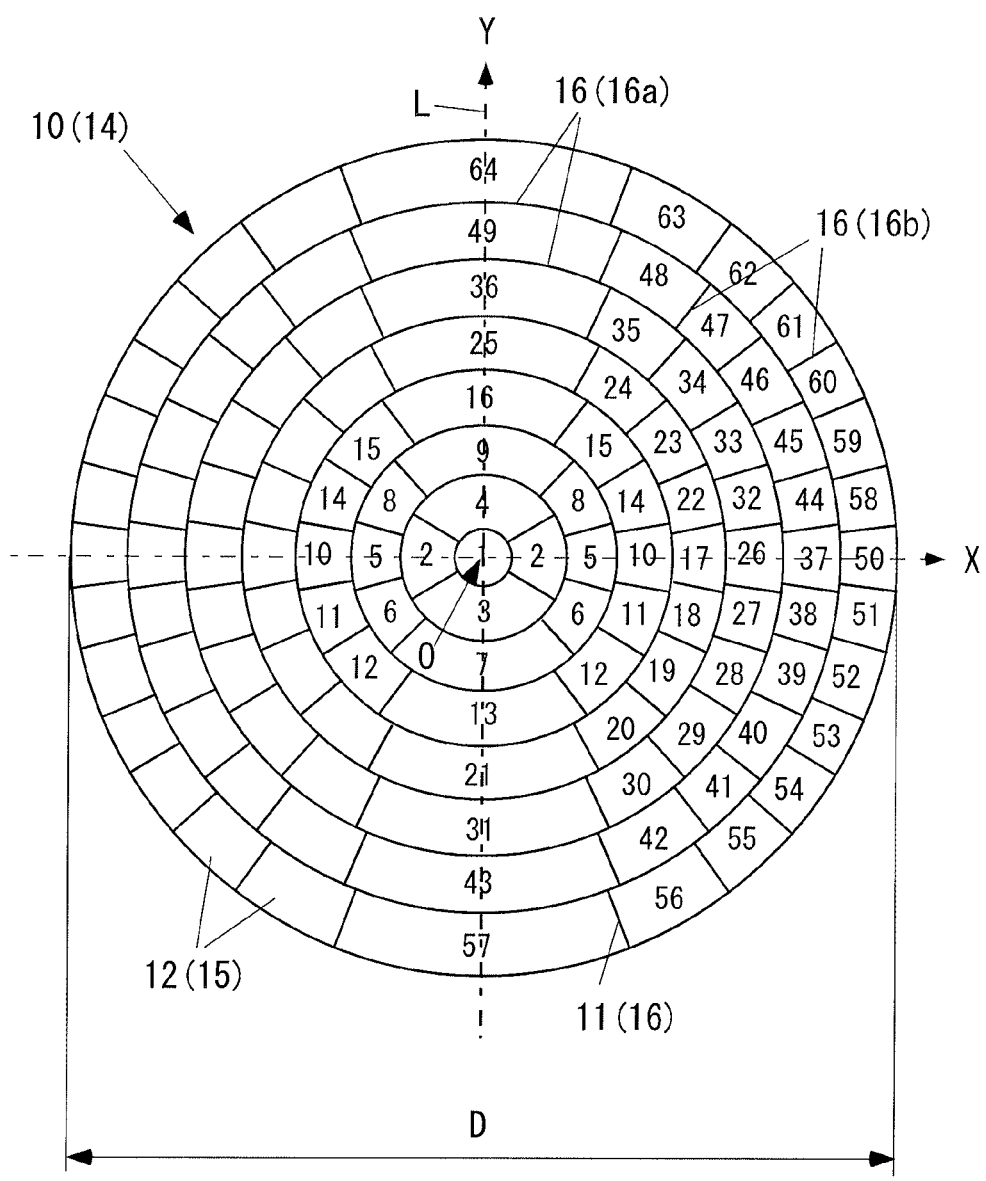

[Fig. 6]
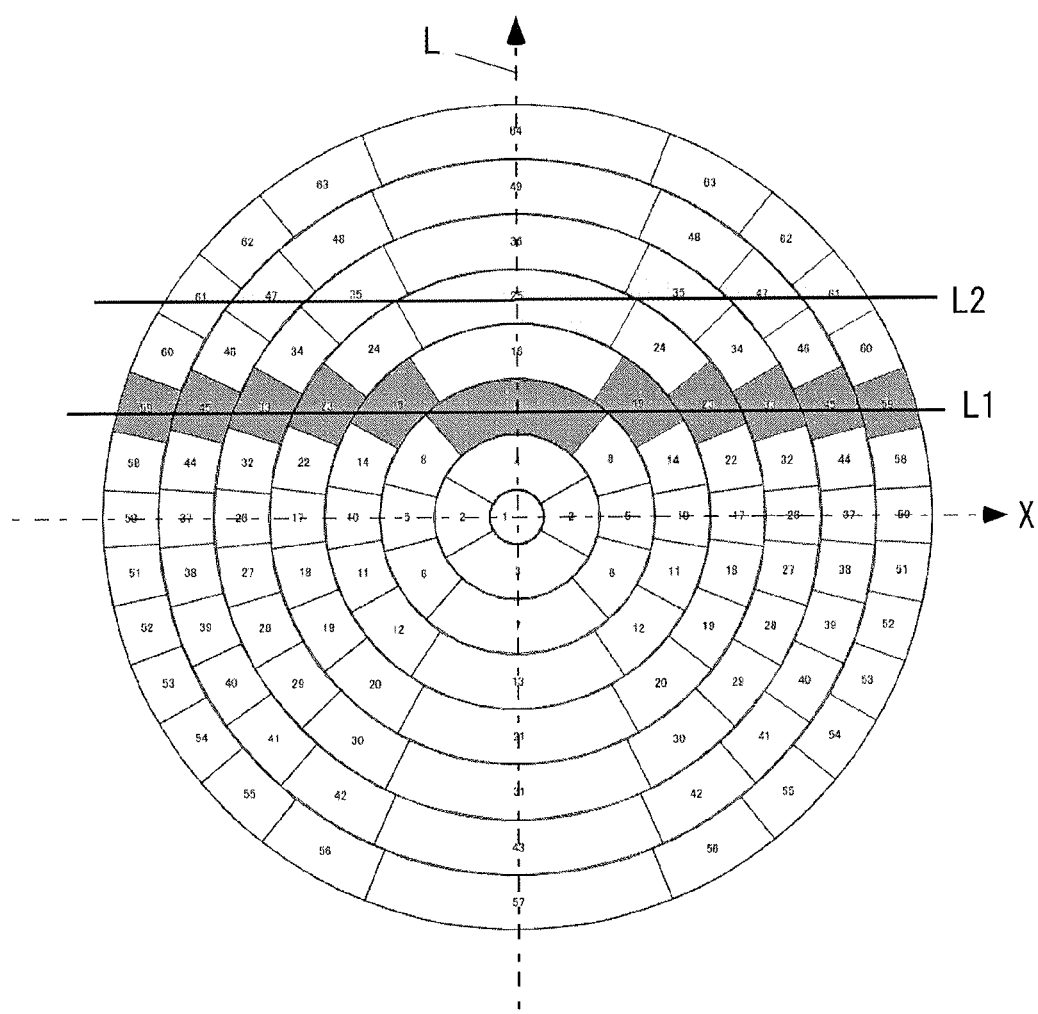

[Fig. 7A]
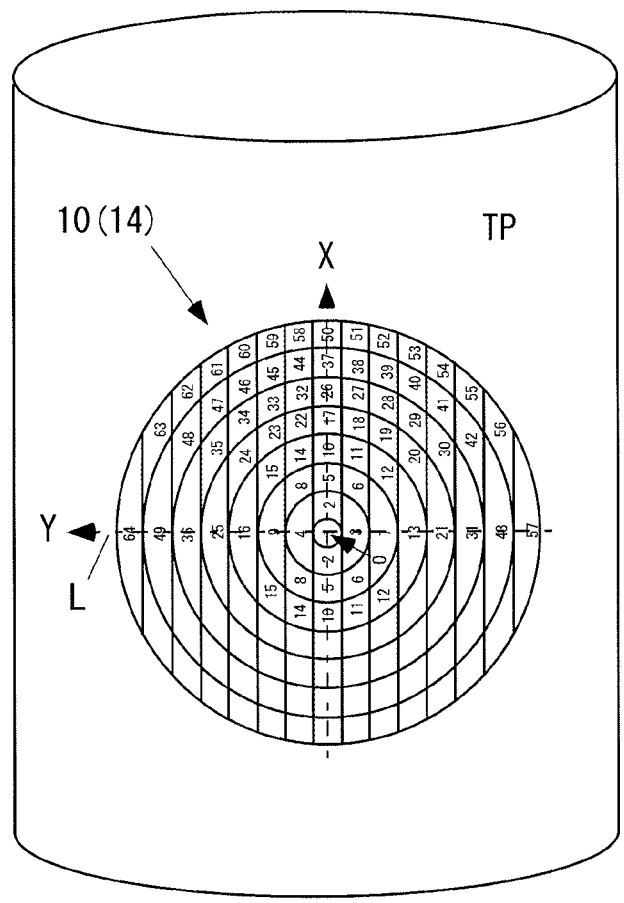
[Fig. 7B]
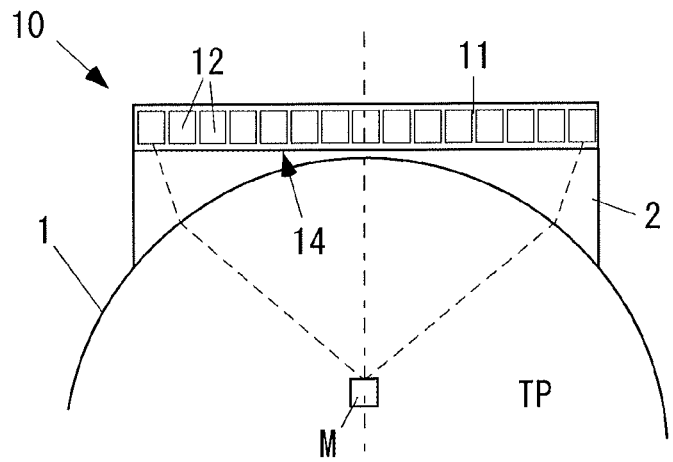

[Fig. 8]
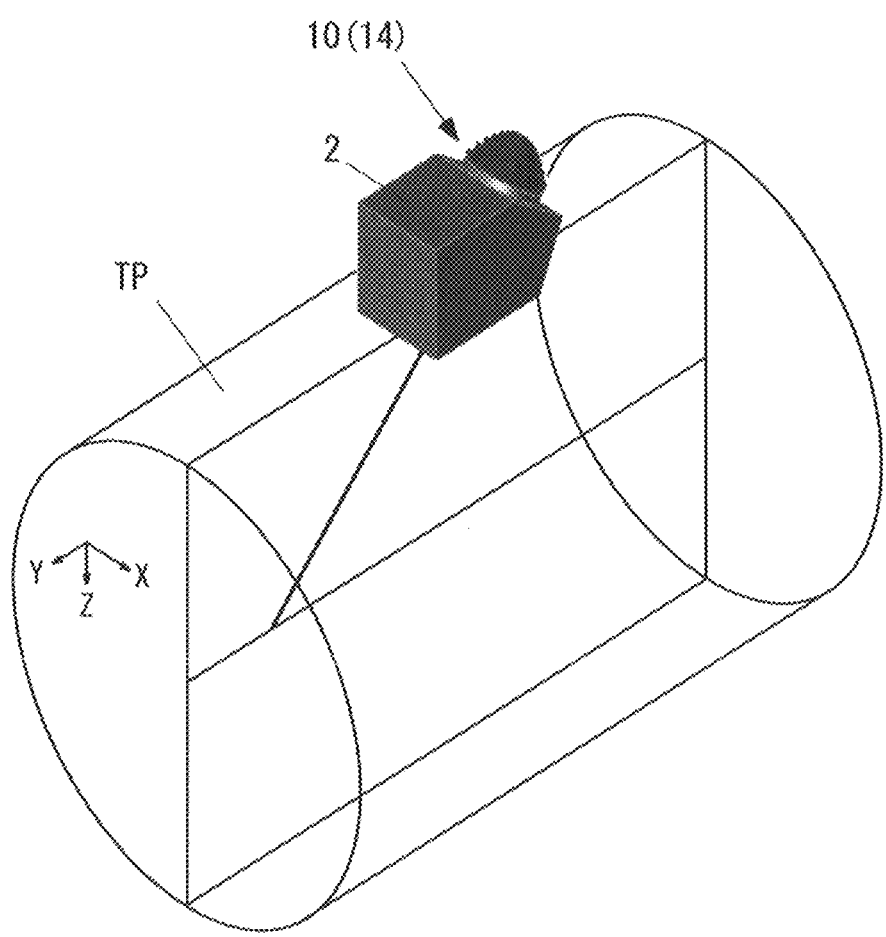

[Fig. 9]
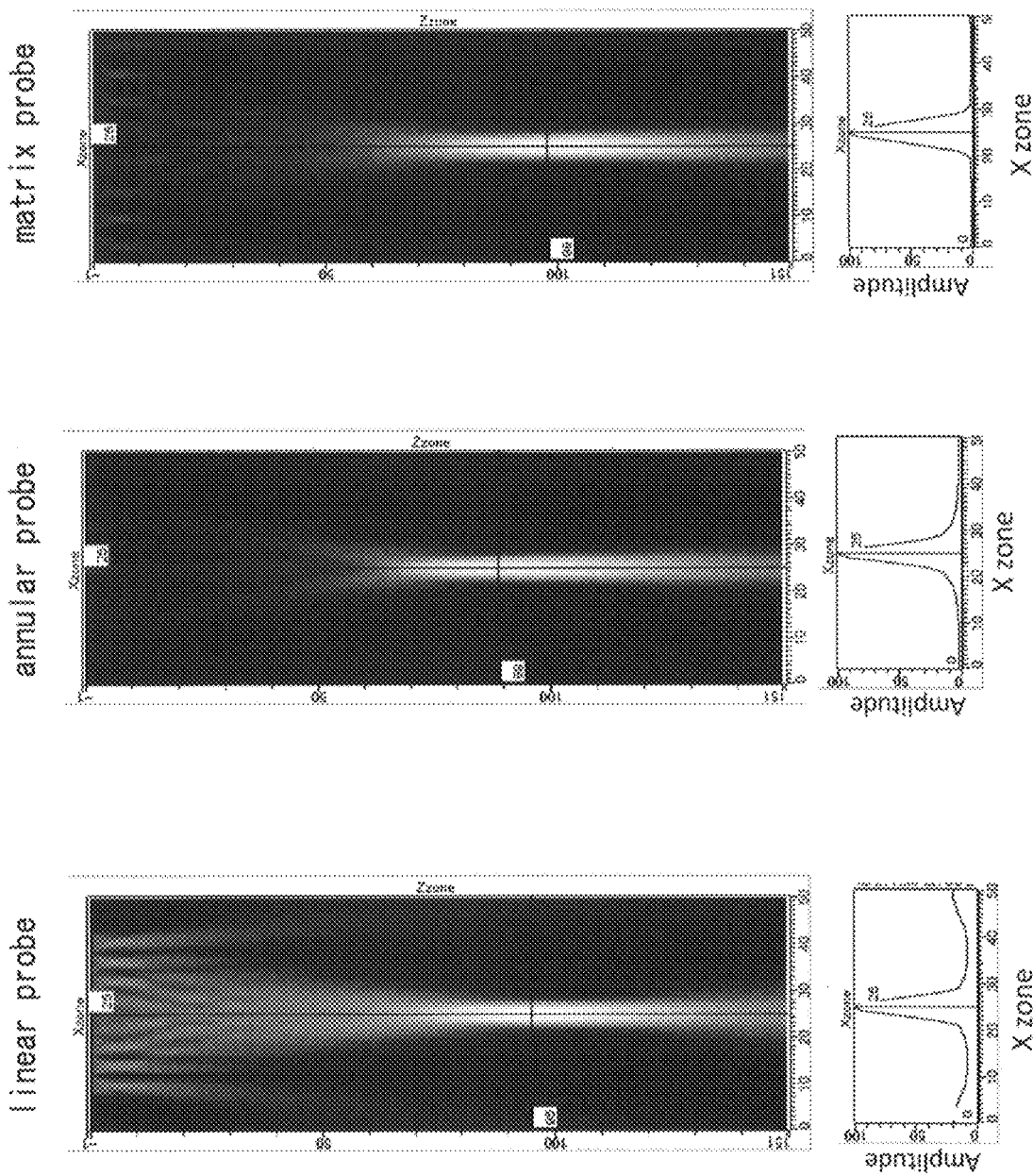

[Fig. 10]
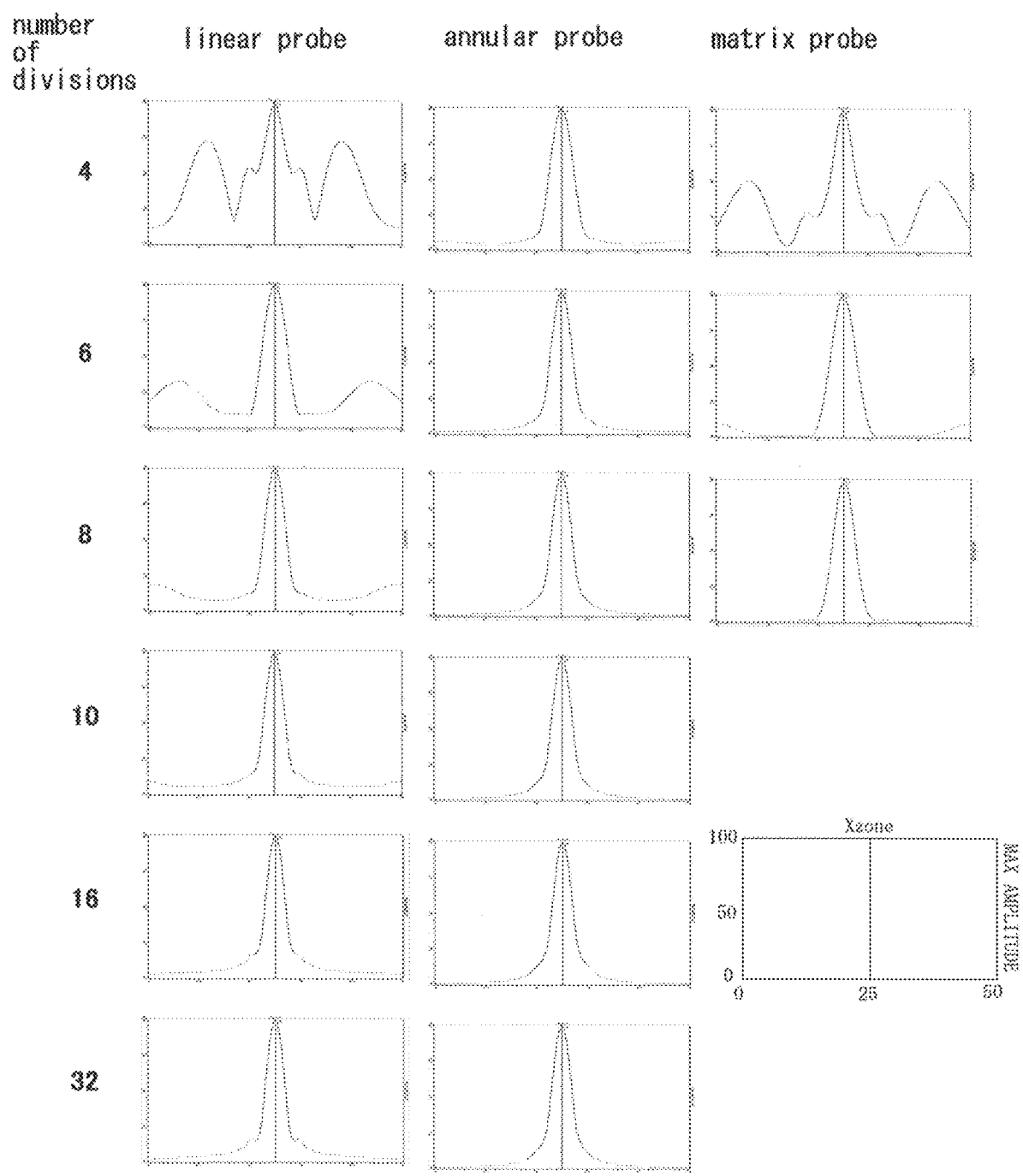

[Fig. 11]
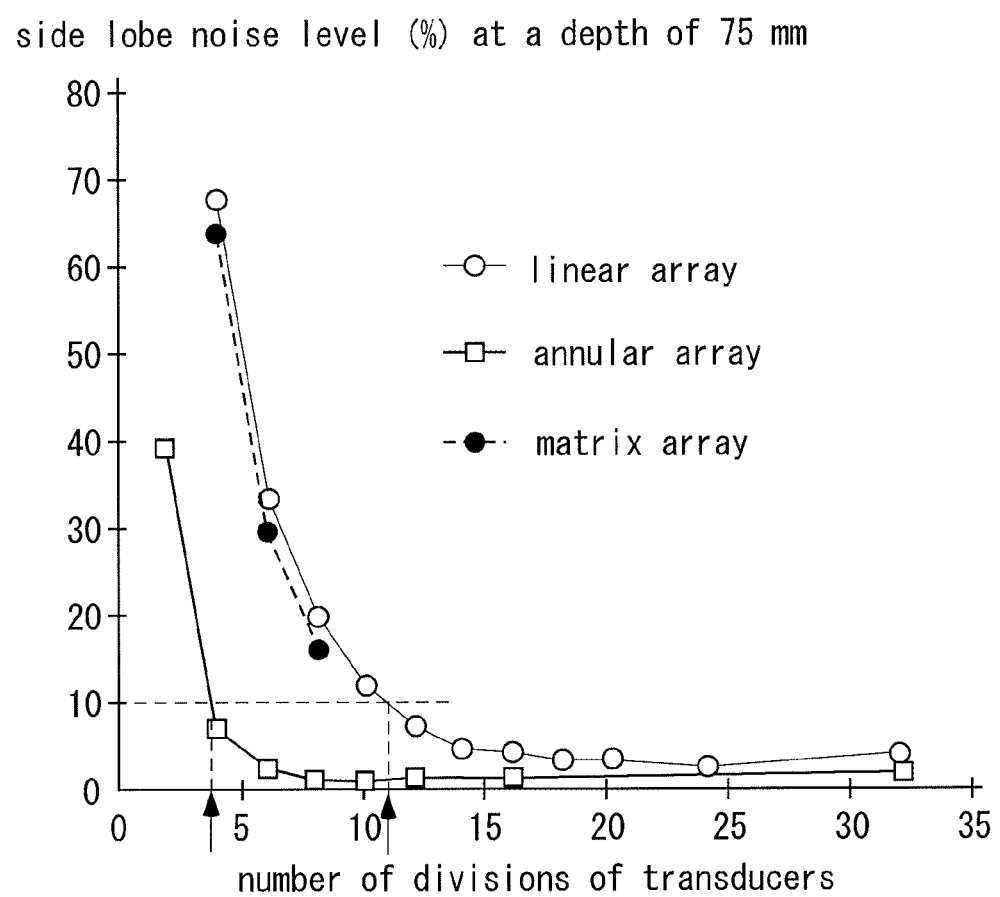

[Fig. 12]
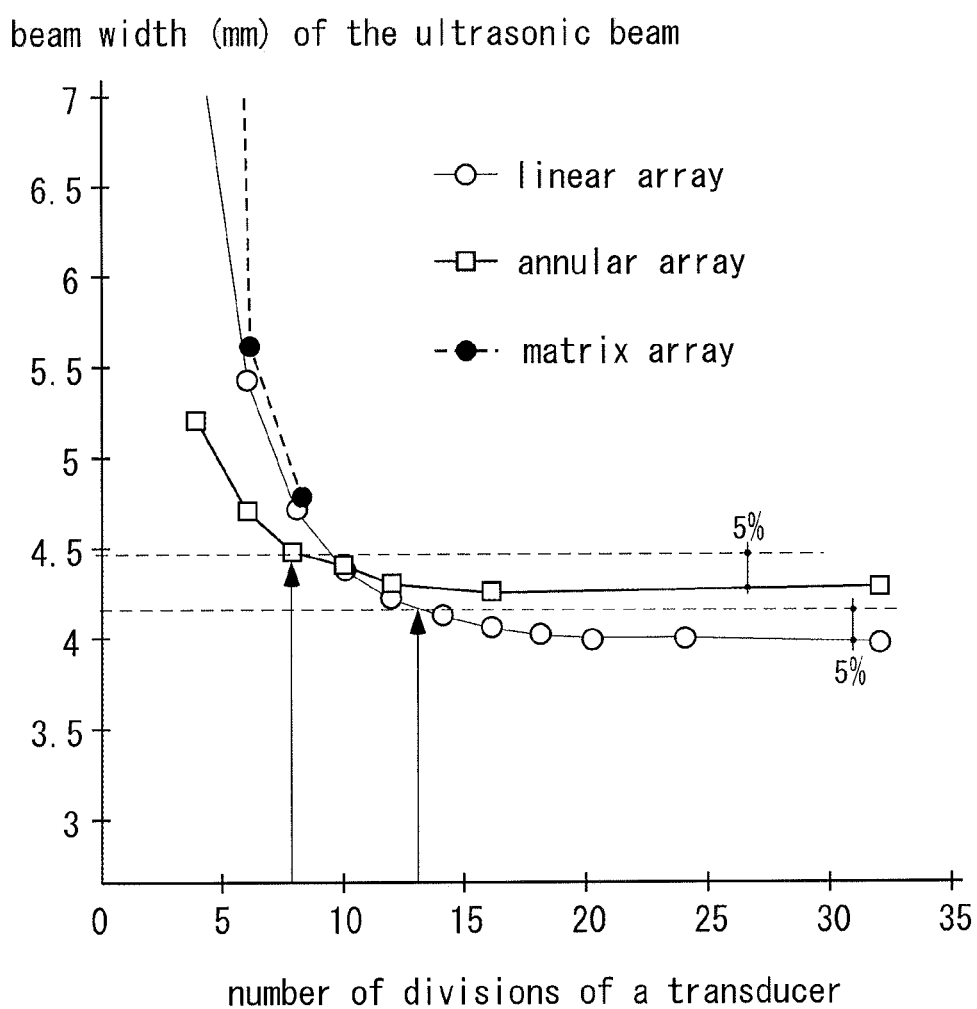

[Fig. 13]
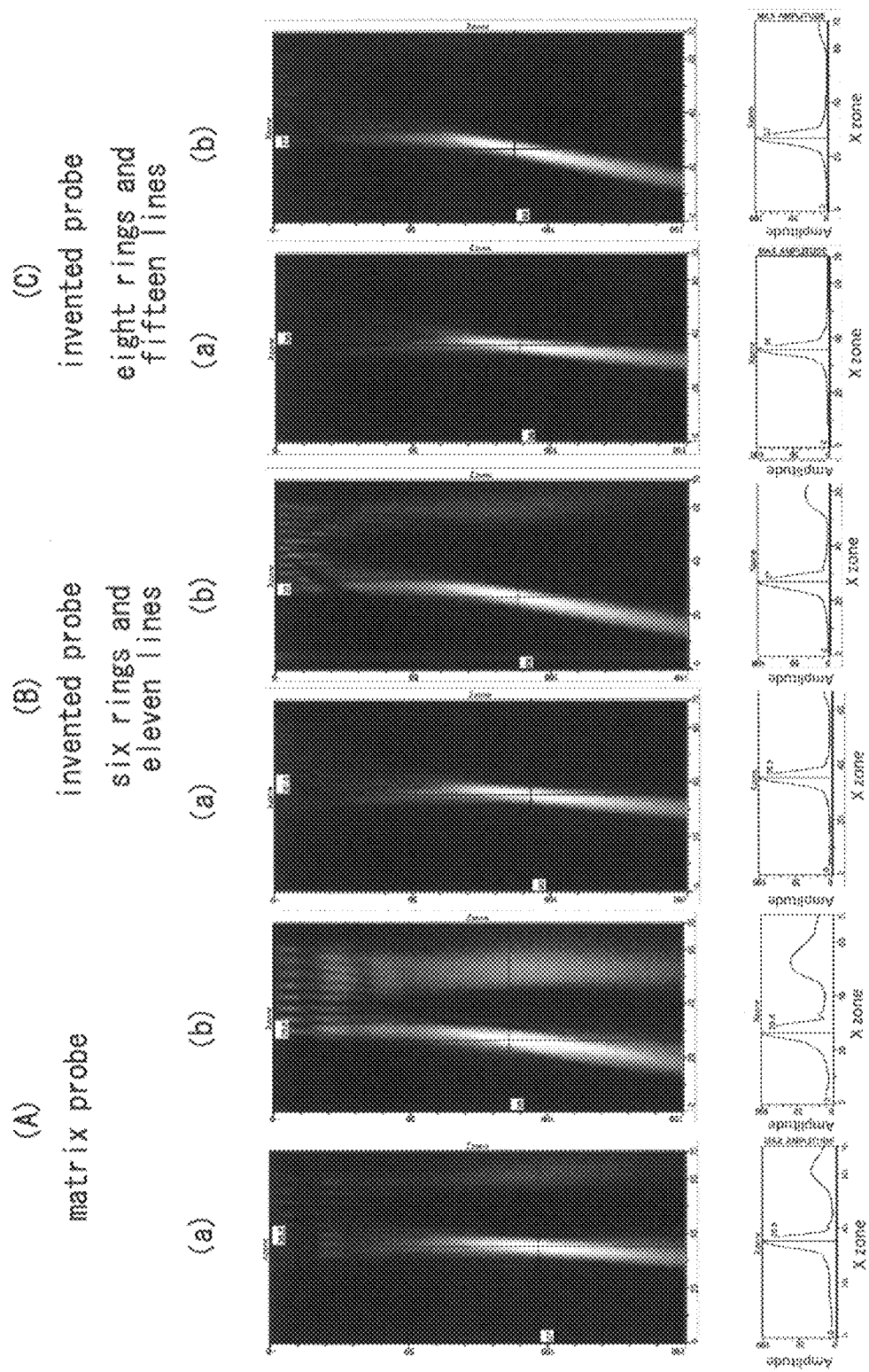

[Fig. 14]
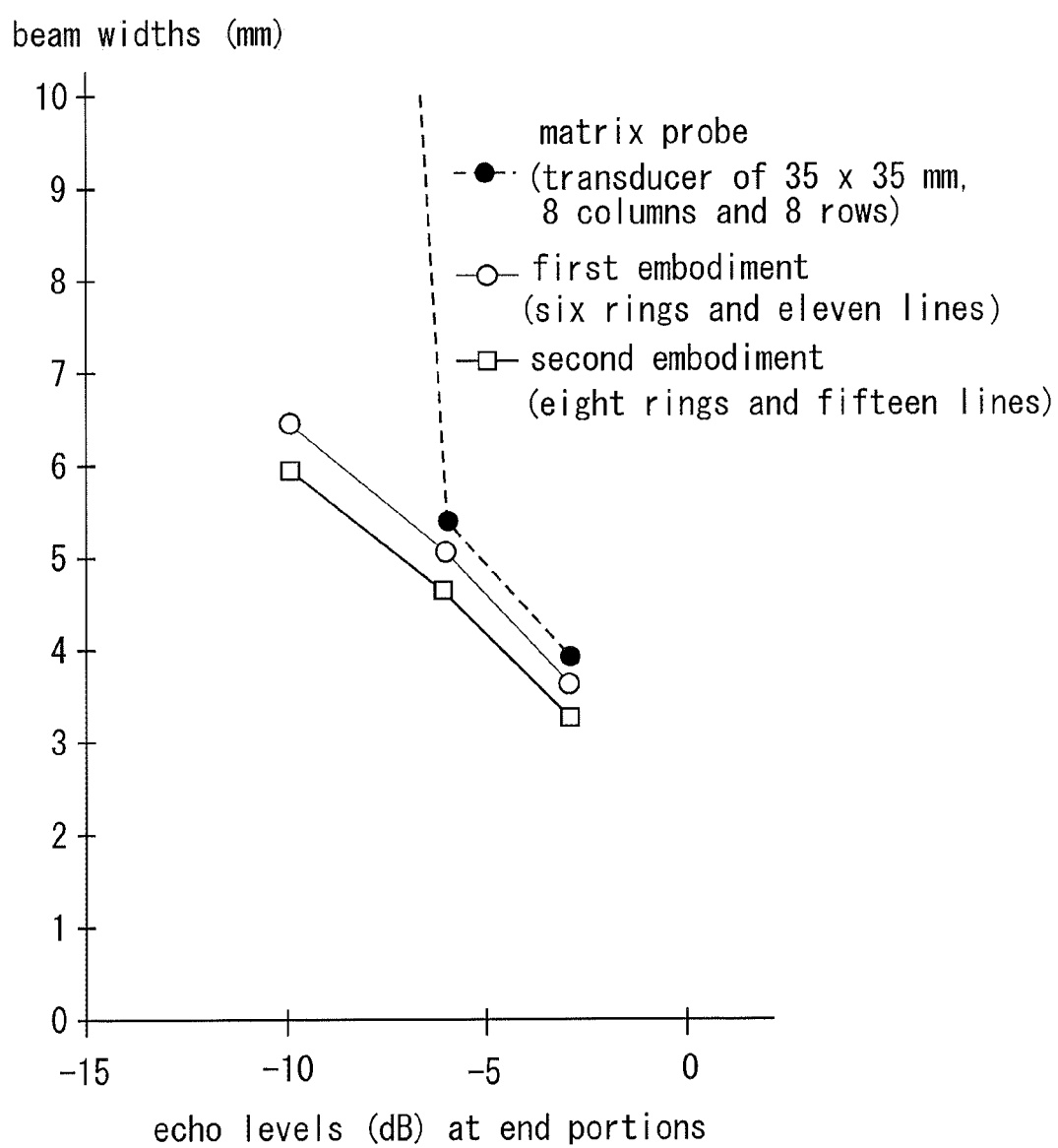

[Fig. 15]
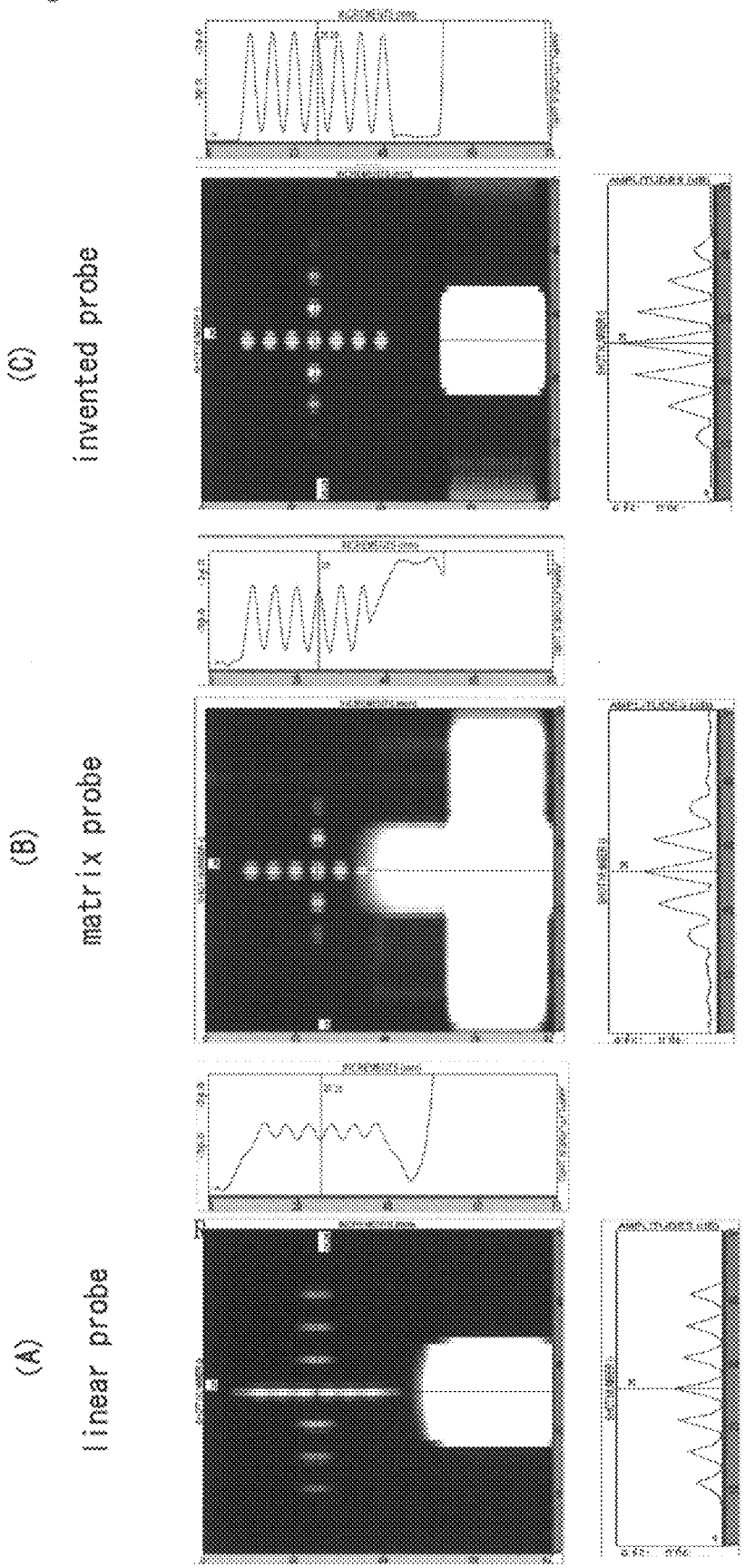

[Fig. 16]
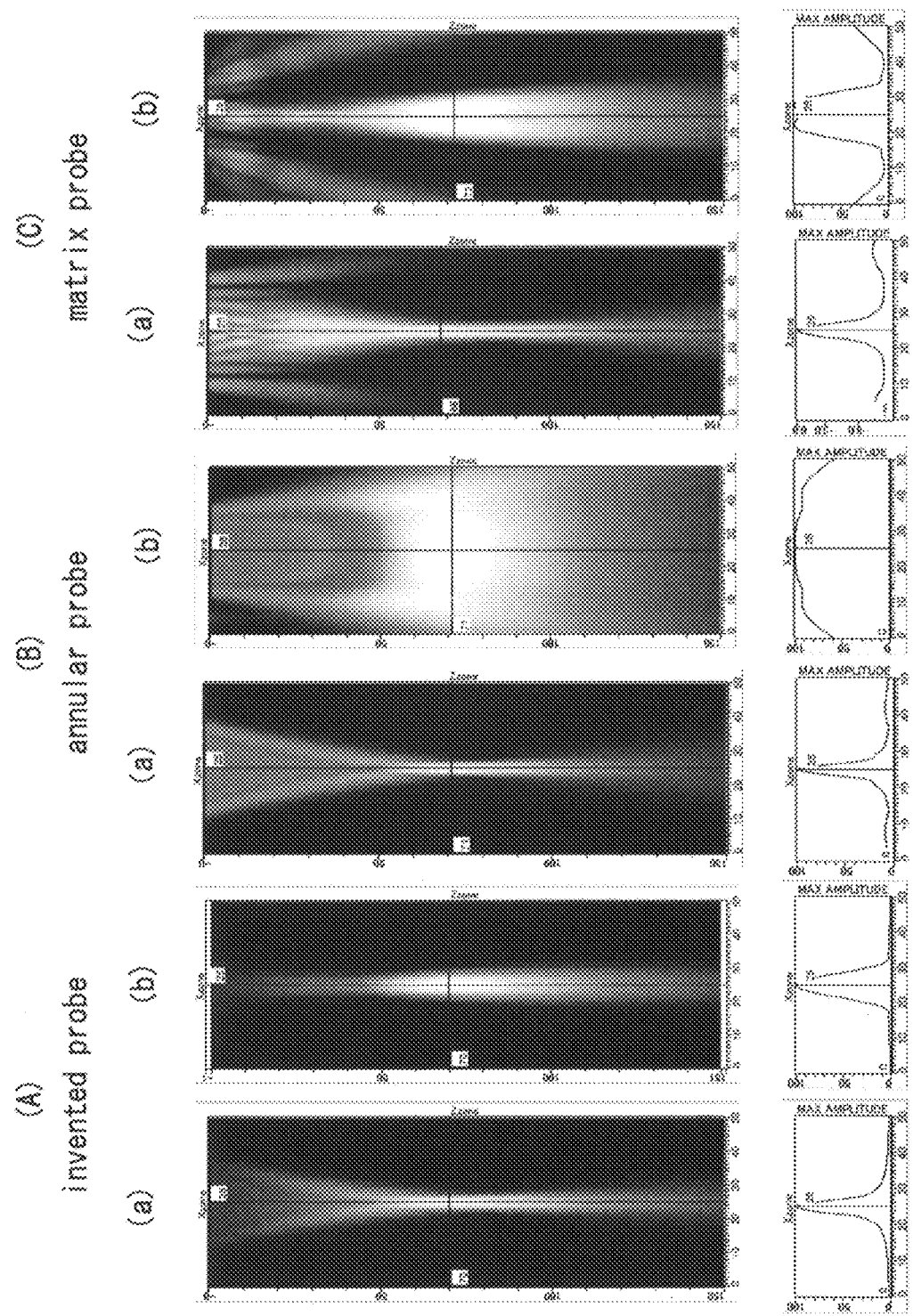

[Fig. 17]
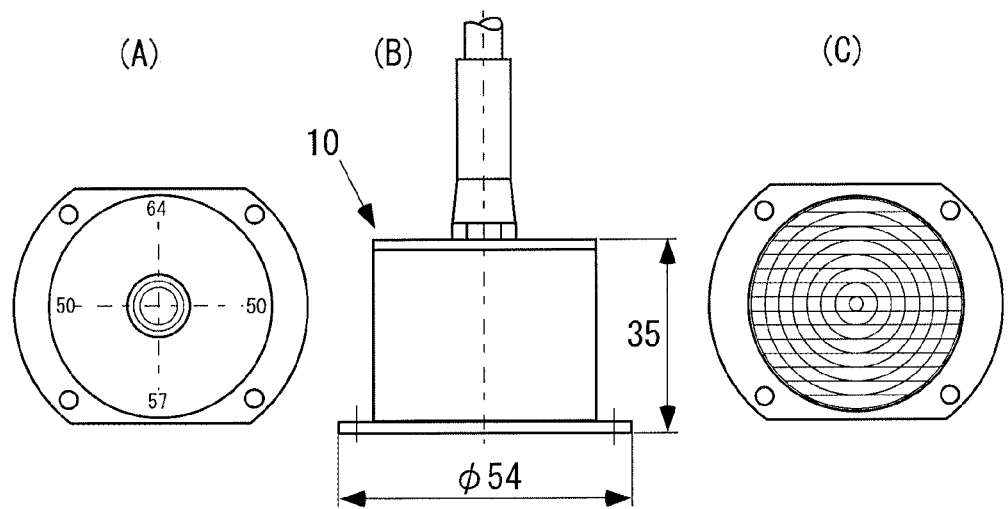
[Fig. 18]
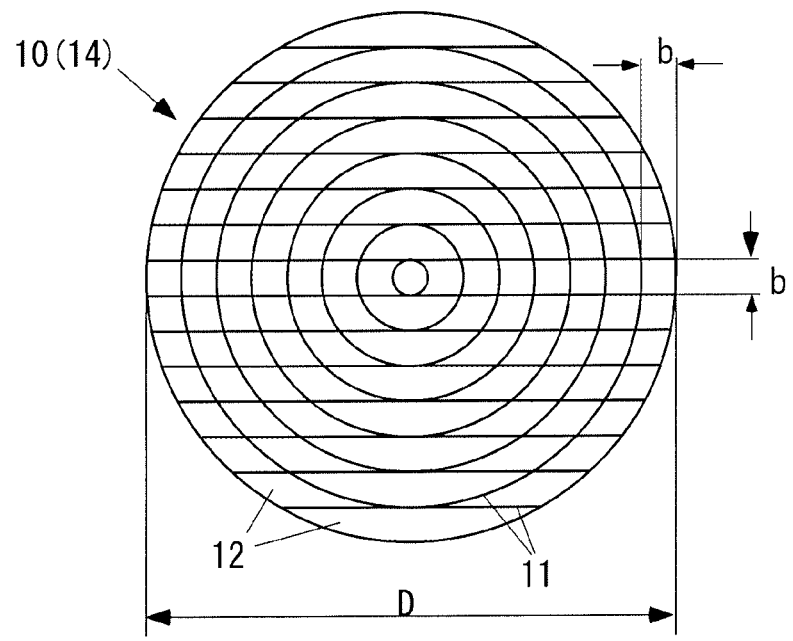

[Fig. 19A]
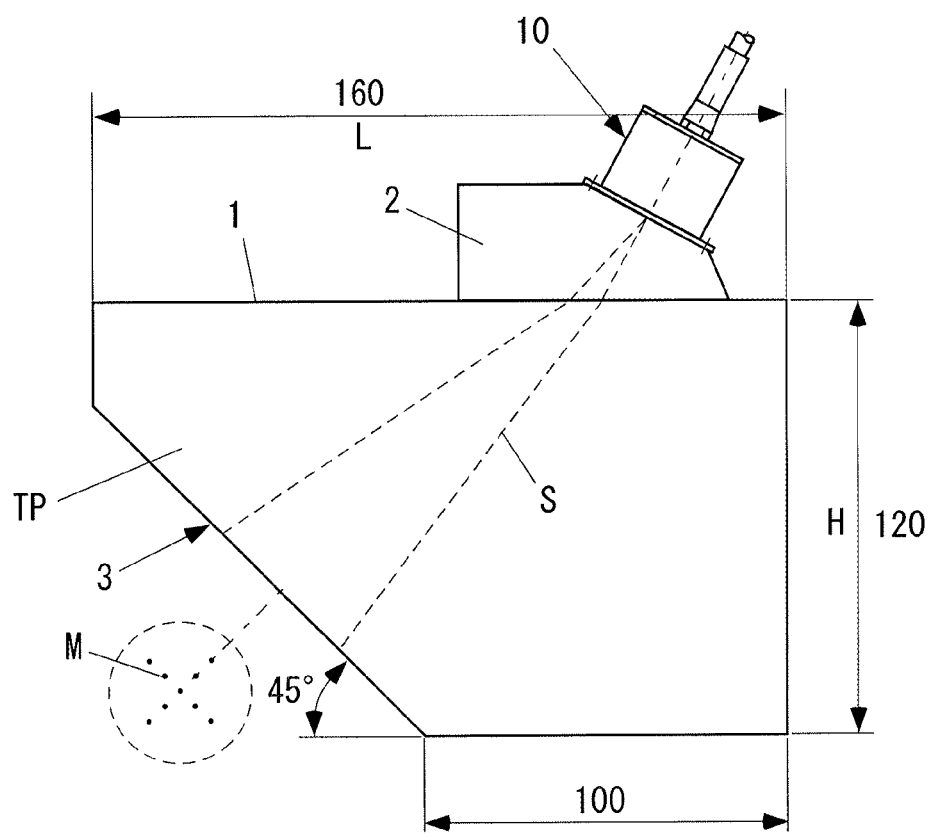
[Fig. 19B]
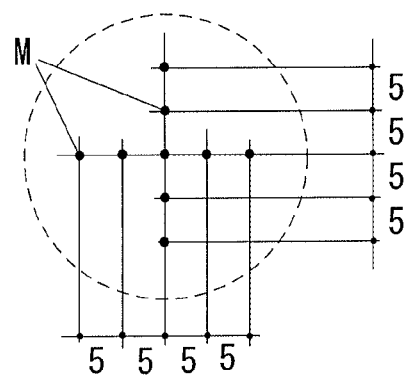

[Fig. 20]
(A) 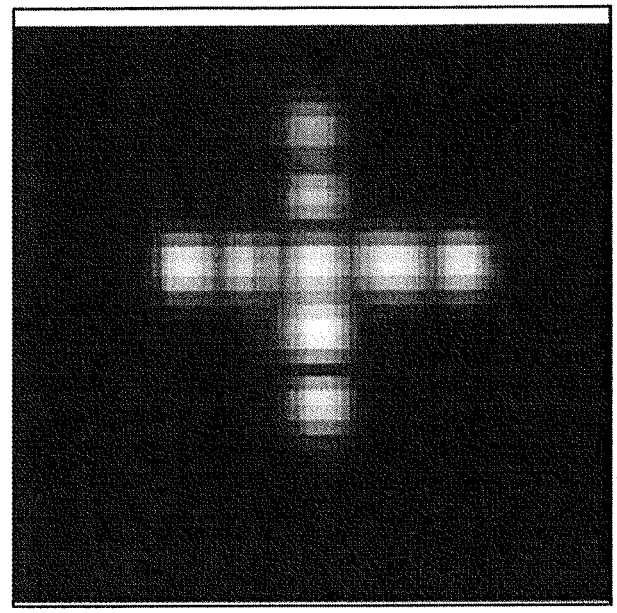
(B) 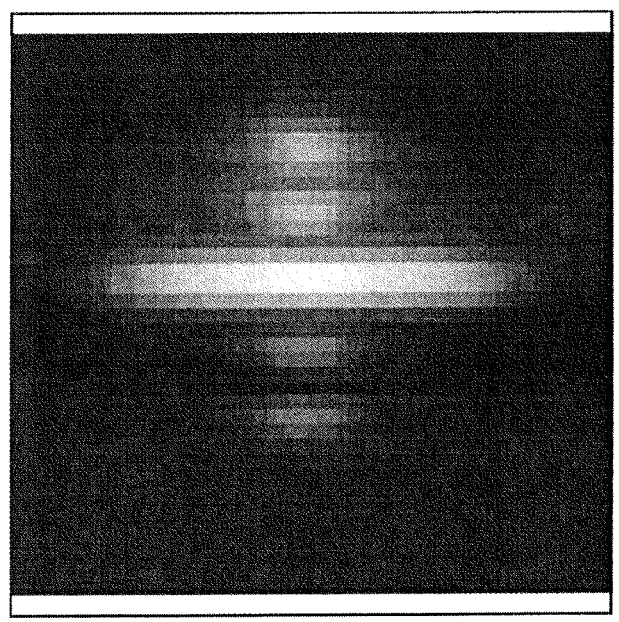

[Fig. 21]
(A)
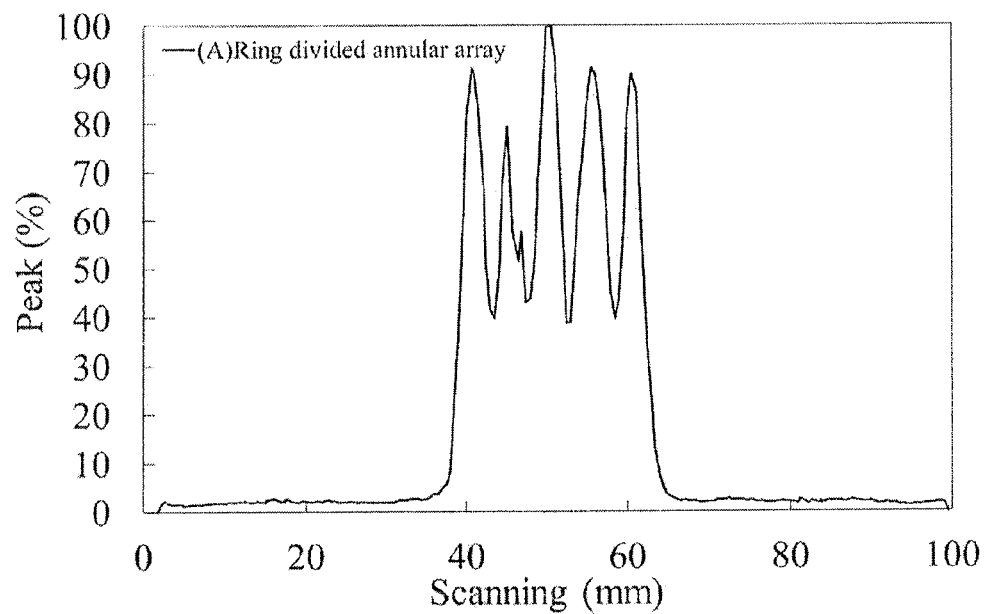
(B)
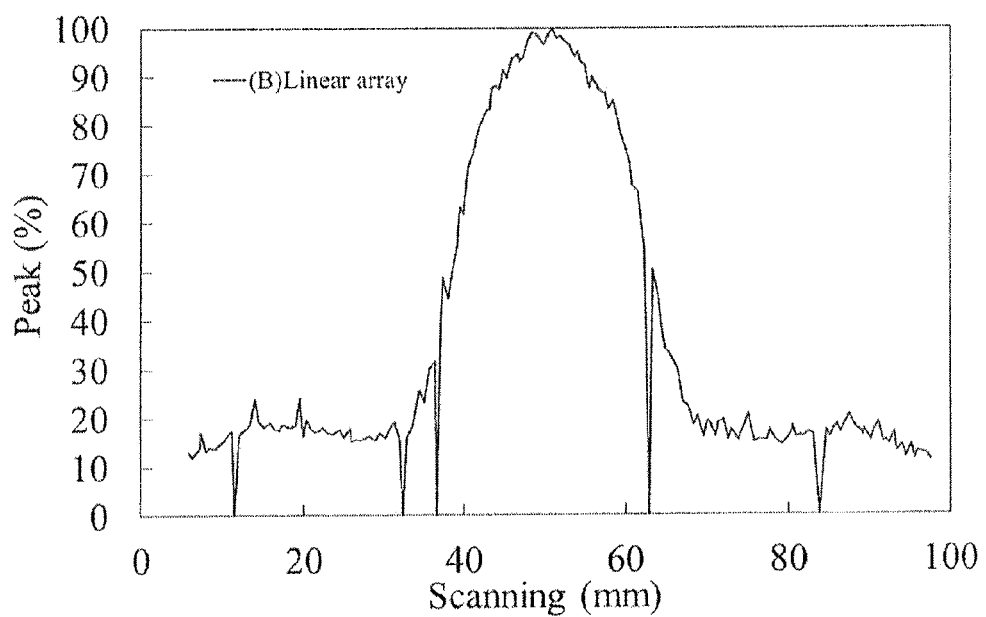

[Fig. 22]
(A)
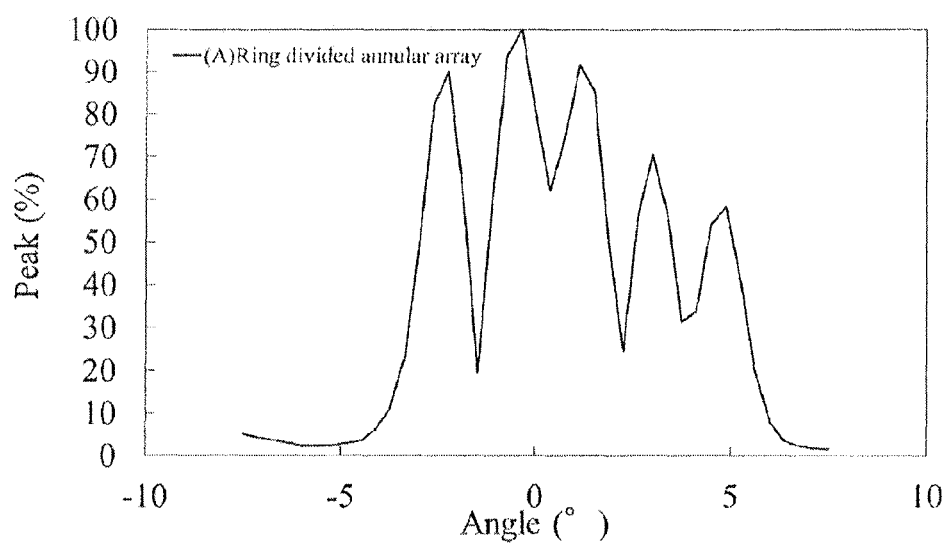
(B)
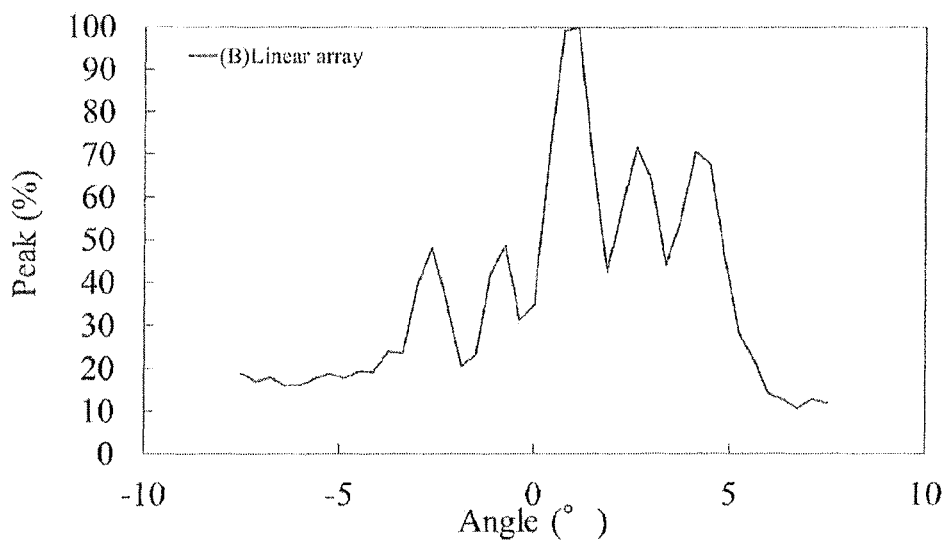

[Fig. 23A]
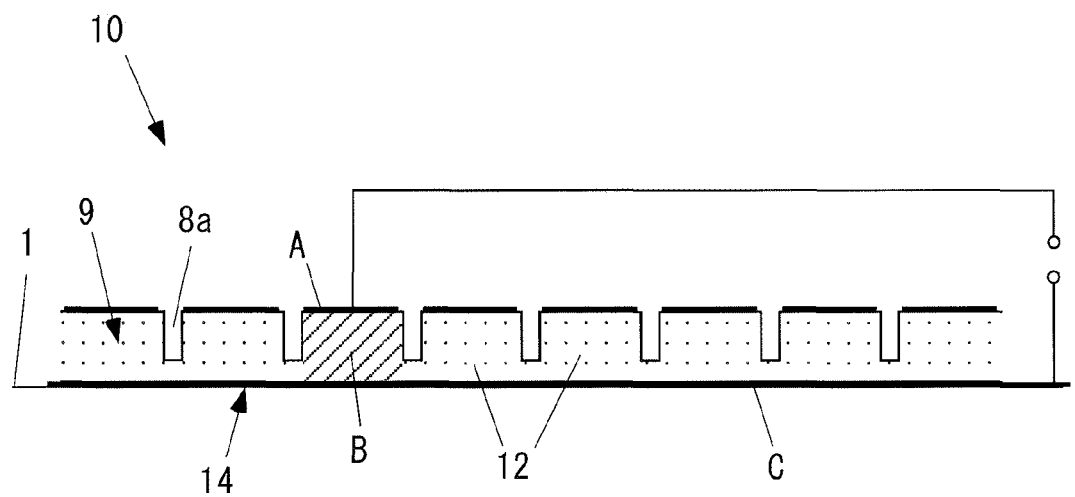
[Fig. 23B]
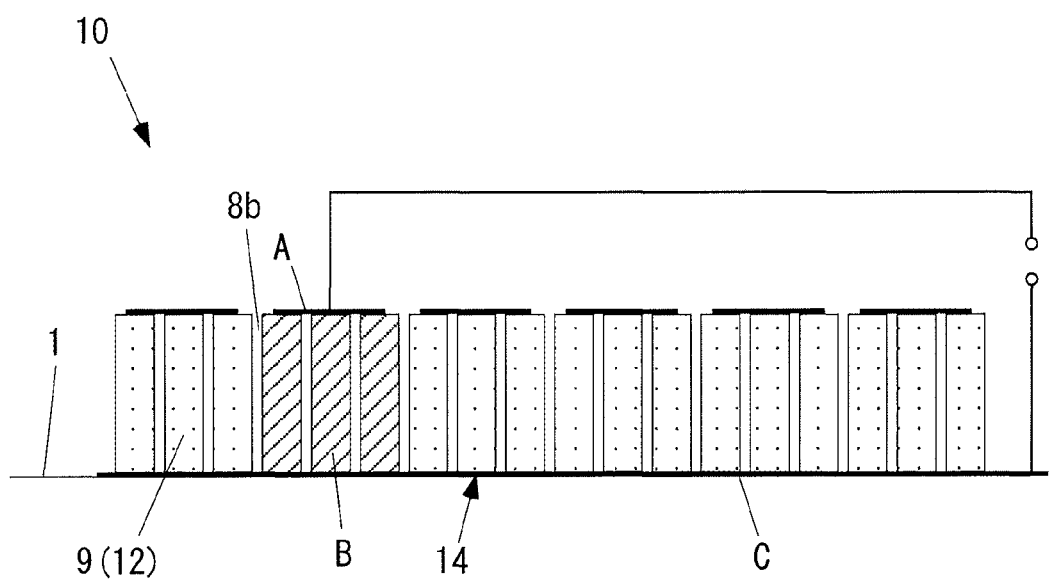

PHASED-ARRAY FLAW-DETECTION DEVICE AND METHOD

TECHNICAL FIELD

The present invention relates to a phased-array flaw-detection device which has a function for exciting a plurality of elements in sequence in circles and a function for exciting the plurality of elements in sequence in rows, and which is capable of causing the two functions to simultaneously act thereby to, for example, focus an ultrasonic beam into a circle and to cause the ultrasonic beam to travel in any direction, and also relates to an ultrasonic flaw-detection method using the phased-array flaw-detection device.

BACKGROUND ART

A phased-array probe is composed of a plurality of transducers. Each of the transducers independently controls the timing (the phase) of transmitting and receiving an ultrasonic wave, and forms a synthesized ultrasonic wavefront thereby to control an ultrasonic beam.

Conventional phased-array probes can be roughly classified into linear array probes, matrix array probes, and annular array probes.

A linear array probe is a probe in which a square transducer is divided in strips in one direction, a matrix array probe is a probe in which a square transducer is divided in two directions, namely, longitudinal and lateral directions, and an annular array probe is a probe in which a circular transducer is divided into concentric circles. These probes all have advantages and disadvantages, and are properly selected according to purposes.

The annular array probes are disclosed in, for example, Patent Documents 1 and 2.

Further, the matrix array probe is disclosed in, for example, Patent Document 3.

CITATION LIST

Patent Literatures

PTL 1: Japanese Patent Publication Laid-open No. 6-38298

PTL 2: Japanese Patent Publication Laid-open No. 2009-105762

PTL 3: Published Japanese Translation of PCT application No. 2016-501375

SUMMARY OF INVENTION

Technical Problem

The linear array probes are capable of electronically changing the traveling direction of an ultrasonic beam (hereinafter referred to simply as "the beam") in a direction orthogonal to the dividing lines of division or focusing the beam at any depth, but are incapable of controlling the beam in a direction orthogonal thereto. Therefore, even if an attempt is made to improve flaw dimensional measurement accuracy by, for example, focusing a beam into a smaller beam width, the beam can be focused only in one direction, thus limiting the improvement of the measurement accuracy in one direction.

Meanwhile, the ring-shaped annular probes are capable of finely focusing an ultrasonic beam in circles and therefore can be expected to improve the measurement accuracy in both longitudinal and lateral directions in, for example, the dimensional measurement of flaws. However, the annular array probes cannot freely control the traveling direction of a beam.

The matrix array probes have both longitudinal and lateral divided surfaces, and can therefore focus an ultrasonic beam in circles like the annular array probes do and can also cause the ultrasonic beam to travel in any direction.

However, in the case of a matrix array probe, the controller thereof has a large number of control channels (hereinafter referred to simply as "the channels") for independently controlling the timing (phase) of each transducer to transmit and receive an ultrasonic wave.

For example, in the case of a 64-channel controller, which is currently in frequent usage, the maximum number of elements of a matrix array probe is 8×8=64, and the number of split surfaces in the longitudinal direction and the lateral direction is small, leading to an excessive noise level.

Further, increasing the number of channels of a controller requires newly developed hardware and software for a controller, thus requiring excessive cost and time.

The present invention has been made with a view toward solving the problems described above. An object of the present invention is to provide a phased-array flaw-detection device which has a function for exciting a plurality of elements in circles in sequence and a function for exciting the plurality of elements in rows in sequence, and which is capable of simultaneously carrying out the two functions thereby to focus, for example, an ultrasonic beam into a circle and to cause the ultrasonic beam to travel in any direction and is also capable of reducing noise level without increasing the number of channels of a controller, and also to provide a phased-array flaw-detection method.

Solution to Problem

According to the present invention, there is provided a phased-array flaw-detection device including:

a phased-array probe having a plurality of ultrasonic transducers which are separated in a concentric circle pattern, separated in rows that are orthogonal to a reference line that passes through the center of circles, and positioned line symmetrically with respect to the reference line; and a controller which has a plurality of control channels for controlling pairs of the line symmetrical ultrasonic transducers under the same conditions.

Further, according to the present invention, there is provided a phased-array flaw-detection method using the foregoing phased-array flaw-detection device, wherein pairs of the ultrasonic transducers that are line symmetrical with respect to the reference line are controlled under the same conditions.

Advantageous Effects of Invention

According to the present invention, a plurality of ultrasonic transducers are separated in the concentric circle pattern, so that the plurality of ultrasonic transducers in the concentric circle pattern can be controlled under the same conditions, enabling the ultrasonic beam of each ultrasonic transducer to be focused into a circle.

Further, the ultrasonic transducers are separated in rows that are orthogonal to the reference line, so that an ultrasonic beam can be led in a direction along the reference line, or a linear focused beam that is focused in the direction of the reference line can be formed by controlling the phase difference of each of the plurality of transducers in the direction of the reference line.

Further, the pairs of line symmetrical ultrasonic transducers are controlled under the same conditions through the plurality of control channels, so that the quantity of ultrasonic transducers along the reference line can be increased without increasing the number of channels of the controller, thus enabling a noise level to be reduced.

BRIEF DESCRIPTION OF DRAWINGS

FIG. 1 is an overall configuration diagram of a phased-array flaw-detection device in accordance with the present invention;

FIG. 2 is a diagram which is a view taken along line A-A of FIG. 1 and which illustrates a first embodiment of an invented probe;

FIG. 3 presents explanatory diagrams of a phased-array flaw-detection method in accordance with the invention;

FIG. 4 is a diagram which is similar to the diagram of FIG. 2 and which illustrates a second embodiment of the invented probe;

FIG. 5 is a diagram which is similar to the diagram of FIG. 2 and which illustrates a third embodiment of an invented probe 10;

FIG. 6 is an explanatory diagram of a control method for the invented probe 10 of FIG. 5;

FIG. 7A is a schematic side view illustrating a case where the invented probe of the second embodiment is used to inspect a test piece having a cylindrical external surface;

FIG. 7B is a sectional view taken along the X-axis in FIG. 7A;

FIG. 8 illustrates, with respect to FIG. 7A and FIG. 7B, an example of angle beam flaw detection in which the invented probe 10 in accordance with the present invention is mounted on a wedge (an intermediate member 2) having a diagonally inclined surface, and an ultrasonic wave is made incident at an angle in the axial direction of a test piece;

FIG. 9 presents comparison diagrams of the beam profiles obtained by the simulations using a linear probe, an annular probe, and a matrix probe in the case where the number of divisions is eight;

FIG. 10 presents comparison diagrams illustrating the heights of echoes in a width direction in the case where the number of divisions is 4 to 32;

FIG. 11 is a diagram illustrating the relationship between the number of divisions of transducers and a side lobe noise level;

FIG. 12 is a diagram illustrating the relationship between the number of divisions of transducers and the beam width of an ultrasonic beam S;

FIG. 13 presents comparison diagrams illustrating the beam profiles of a matrix probe and the first and the second embodiments of the invented probe;

FIG. 14 is a diagram illustrating the relationship between the echo levels at end portions and beam widths;

FIG. 15 presents comparison diagrams of the flaw detection test results of a linear probe, a matrix probe, and the invented probe;

FIG. 16 presents comparison diagrams of the flaw detection test results of the invented probe, an annular probe, and a matrix probe, the test having been conducted on a test piece which has a cylindrical external surface;

FIG. 17 presents the outline drawings of the invented probe that has been fabricated;

FIG. 18 is a layout diagram of the ultrasonic transducers of the invented probe that has been fabricated;

FIG. 19A is an explanatory diagram illustrating the test conditions of the invented probe that has been fabricated;

FIG. 19B is an explanatory diagram of flaws;

FIG. 20 presents C-scan images on a defective plane;

FIG. 21 presents peak diagrams in a scanning direction;

FIG. 22 presents peak diagrams in a direction that is orthogonal to the scanning direction;

FIG. 23A is a sectional view illustrating a construction example of a probe; and FIG. 23B is a sectional view illustrating another construction example of a probe.

DESCRIPTION OF EMBODIMENTS

The following will describe preferred embodiments of the present invention with reference to the accompanying drawings. In the drawings, common parts will be assigned the same reference signs and duplicate explanations will be omitted.

FIG. 1 is an overall configuration diagram of a phased-array flaw-detection device 100 in accordance with the present invention.

In the diagram, the phased-array flaw-detection device 100 includes a phased-array probe 10 and a controller 20. Reference sign 1 denotes the surface of a test piece TP (the surface of a test piece).

Hereinafter, the phased-array probe 10 in accordance with the present invention will be abbreviated simply as "the probe 10" or "the invented probe 10."

The phased-array probe 10 (the invented probe 10) has a plurality of ultrasonic transducers 12 that are independently excited.

FIG. 23A is a sectional view illustrating a construction example of the probe 10.

In the case where a plurality of ultrasonic transducers 12 are formed on a single piezoelectric element 9 (piezoelectric ceramic, crystal, or the like), if a region in which the plurality of ultrasonic transducers 12 are to be independently excited, then the plurality of ultrasonic transducers 12 are required to be separated so that the vibration in a particular region (excitation region B) will not affect other regions.

More specifically, one common electrode C is attached to a detection surface 14 of the probe 10, and an electrode on the other side is divided (split electrodes A) beforehand, so that a voltage is applied only to a predetermined region (the excitation region B). Further, deepest possible grooves 8a are provided in the piezoelectric element 9 according to the division of the split electrodes A so as to prevent the vibration that occurs in the excitation region B from being propagated to other regions, thus dividing the electrode into a plurality of ultrasonic transducers 12.

To be specific, preferably, electrodes A and C are attached to both sides of the single piezoelectric element 9, and in the last stage, an electrode A and the piezoelectric element 9 together are separated by deepest possible grooves 8a from the opposite side of the detection surface 14, thereby creating the plurality of ultrasonic transducers 12.

FIG. 23B is a sectional view illustrating another construction example of the probe 10.

As illustrated in the diagram, the probe 10 is preferably a composite type in which small piezoelectric elements 9, which are divided into small pieces having a lattice-like shape or a column-like shape, are arranged, and an epoxy resin or the like is filled in gaps 8b.

According to the composite type, the excitation region B of the plurality of ultrasonic transducers 12 that are independently excited can be formed by attaching the single common electrode C to the detection surface 14 will be excited, and the vibration thereof will surface 14 and by providing the plurality of split electrodes A in the region to be excited on the opposite side.

In other words, in FIG. 23B, only the minute piezoelectric element 9 sandwiched between a split electrode A to be energized and the common electrode C of the detection surface 14 will be excited, and the vibration thereof will not affect other piezoelectric elements 9.

According to the construction, the complicated division of a plurality of vibration regions can be accomplished by forming the split electrodes A on one surface by using, for example, a plating technology. In other words, the single composite type piezoelectric element 9 can be divided into the plurality of ultrasonic transducers 12 simply by dividing beforehand the electrode on the opposite side from the detection surface 14.

In FIG. 1, a gap 11 is provided between adjoining ultrasonic transducers 12, so that each of the ultrasonic transducers 12 independently operates. The gap 11 corresponds to the groove 8a in FIG. 23A or the gap 8b in FIG. 23B.

The size (gap width) of the gap 11 is 0.05 mm in the example, which will be described later.

Further, the invented probe 10 has the detection surface 14 which transmits and receives the ultrasonic beam S.

Although the detection surface 14 is in direct contact with the surface of the test piece TP (a test piece surface 1) in this example, the intermediate member 2 (refer to FIG. 7B and FIG. 8) may be provided therebetween.

The controller 20 controls the plurality of ultrasonic transducers 12 and transmits and receives the ultrasonic beam S by the individual ultrasonic transducers 12. For example, the frequency of the ultrasonic beam S is 5 MHz, which is usable in steel in the example which will be described later.

Referring to FIG. 1, the phased-array flaw-detection device 100 further includes a display device 22 and an image processing unit 24.

The display unit 22 is a display device and mainly displays the flaw detection waveform of the ultrasonic beam S received by the invented probe 10.

The image processing unit 24, for example, extracts the diffracted wave of a foreign matter (e.g. a crack) from a flaw detection waveform, and geometrically determines the size of the foreign matter.

Referring to FIG. 1, the present invention assumes a case where the test piece TP is a pressure vessel or a thick-walled pipe made of steel, and a flaw M to be detected is positioned at a depth x from the test piece surface 1. This type of object to be inspected corresponds to a pressure vessel or a pipe for an atomic energy or a boiler.

As described above, for example, the controller 20 having channels, which is currently in frequent usage, is disadvantageous in that the maximum number of elements of a matrix array probe is 8×8=64, thus limiting the number of elements used for the longitudinal direction and the lateral direction and therefore making it difficult to control the ultrasonic beam S.

Especially when focusing a beam to a position that is deep below the test piece surface 1, the size of the entire transducer will be increased, significantly influencing the limitation of the number of divisions.

For example, the range in which the ultrasonic beam S can be focused (the depth x from the test piece surface 1) is within an acoustic near field and is denoted by expression (1) given below. Therefor a larger transducer provides a higher focusing effect.

$$x < D^2/4\lambda \qquad (1)$$

where D: Nominal diameter of transducer to be divided
λ: Wavelength

The nominal diameter D means the diameter of a circle corresponding to the area of the transducer.

More specifically, focusing the ultrasonic beam S in the vicinity of a depth of 100 mm by a longitudinal wave in steel requires the division of a transducer of at least 24 mm (using 5 MHz, which is usable in steel), or an element of approximately 35 mm is desirably divided in order to accomplish more effective focusing.

It is necessary, therefore, to increase the nominal diameter D of the transducer to be divided.

FIG. 2 is a diagram which is a view taken along line A-A of FIG. 1 and which illustrates a first embodiment of the invented probe 10.

In the diagram, the plurality of ultrasonic transducers 12 are positioned, being separated in a concentric circle pattern having a center O and each circle being separated in the circumferential direction. Further, the ultrasonic transducers 12 are separated in rows in a direction that is orthogonal to a reference line L passing through the center O of the concentric circles, and are line symmetrical with respect to the reference line L.

The concentric circles are not limited to complete concentric circles and may alternatively be, for example, elliptical concentric shapes.

In this example, the reference line L is the Y-axis in the drawing.

The outputs of the ultrasonic transducers 12 are proportional to the sizes thereof. The sizes of the line symmetrical ultrasonic transducers 12 are set to be the same.

Referring to FIG. 2, the detection surface 14 of the invented probe 10 has a circular shape having the diameter D, and has a plurality of segments 15 divided into a plurality of arc-shaped portions that are symmetrical with respect to the reference line L. The segment 15 corresponds to the foregoing single ultrasonic transducer 12.

The segments 15 in this example are formed of a central circular portion and the remaining arc-shaped portions. The shape of the segment 15 is not limited to that of this example and may be a different shape.

Further, the size of the gap 11 between the adjoining segments 15 (the gap width) is preferably constant, but may alternatively change. Hereinafter, if the gap width is constant or close to constant, then the gap 11 between the segments will be referred to as a dividing line 16.

The dividing lines 16 of the segments 15 in this example are composed of a plurality of circular dividing lines 16a and a plurality of linear dividing lines 16b.

Referring to FIG. 2, the linear dividing lines 16b are parallel to each other, orthogonal to the reference line L passing through the center O of the circles, and in contact with both ends of the circular dividing lines 16a. In this case, the linear dividing lines 16b are straight lines which pass through the intersection points of the reference line L and the circular dividing lines 16a and which are parallel to each other.

In this example, there are five circular dividing lines 16a, which divide the circle of the detection surface 14 into six annular portions (ring-shaped portions). There are ten linear dividing lines 16b in this example, dividing the ring-shaped portions 61 into arc-shaped portions (including the one central circle). Hereinafter, the division in FIG. 2 will be referred to as "the 6-ring, 11-line division."

In FIG. 2, the number given in each of the segments 15 denotes a segment number I. Each of the segments 15 is assigned a different segment number I (=1 to 61).

As a result, the detection surface 14 has sixty-one segments 15 divided by the circular dividing lines 16a and the linear dividing lines 16b.

The controller 20 has a plurality of control channels 21. The control channels 21 control the pairs of line symmetrical ultrasonic transducers 12 under the same conditions.

The plurality of (sixty-one in this example) control channels 21 control the ultrasonic transducers 12 of the segments 15 of the segment numbers I (=1 to 61).

The phased-array flaw-detection method in accordance with the present invention uses the phased-array flaw-detection device 100 described above to simultaneously excite the pairs of ultrasonic transducers 12 that are line symmetrical with respect to the reference line L at the same phase.

FIG. 4 is a diagram which is similar to the diagram of FIG. 2 and which illustrates a second embodiment of the invented probe 10.

Referring to FIG. 4, as with the first embodiment, linear dividing lines 16b are orthogonal to a reference line L passing through the center of circles and are in contact with both ends of circular dividing lines 16a.

In this example, there are seven circular dividing lines 16a, dividing the circle of a detection surface 14 into eight annular portions (ring-shaped portions). There are fourteen linear dividing lines 16b in this example, dividing the ring-shaped portions into many (113) arc-shaped portions (including one central circle). Hereinafter, the division in FIG. 4 will be referred to as "the 8-ring, 15-line division."

Referring to FIG. 4, segments 15 having segment numbers I of, for example, 10, 11, 12, 14 and 15, are positioned line symmetrically with respect to a Y-axis, and are controlled under the same conditions by a same control channel 21.

The same applies to other pairs of ultrasonic transducers that are positioned line symmetrically with respect to the Y-axis.

The rest of the configuration is the same as the configuration of the first embodiment.

FIG. 5 is a diagram which is similar to the diagram of FIG. 4 and which illustrates a third embodiment of the invented probe 10.

In this example, there are seven circular dividing lines 16a, dividing the circle of a detection surface 14 into eight annular portions (ring-shaped portions). There are many (112) linear dividing lines 16b in this example, dividing the ring-shaped portions into many (113) arc-shaped portions (including one central circle).

Referring to FIG. 5, the number given in each of segments 15 denotes a segment number I. A pair of segments 15 positioned line symmetrically with respect to a Y-axis is assigned the same segment number I (=1 to 64).

In other words, in a detection surface 14 of this example, the fifteen segments 15 positioned on the Y-axis are assigned different segment numbers I, while the pairs of segments 15 positioned line symmetrically with respect to the Y-axis are assigned the same segment numbers I.

As a result, the detection surface 14 has 113 segments 15 divided by the circular dividing lines 16a and the linear dividing lines 16b.

FIG. 6 is an explanatory diagram of the control method for the invented probe 10 of FIG. 5.

The third embodiment differs from the first and the second embodiments in that the linear dividing lines 16b are lines in the radial direction, are not orthogonal to a reference line L, and are not in contact with both ends of the circular dividing lines 16a.

However, as illustrated in FIG. 6, the advantages equivalent to those of the first and the second embodiments can be obtained by controlling the plurality of segments 15 positioned on straight lines (e.g. L1 and L2) that are parallel to an X-axis (orthogonal to the reference line L) under the same conditions.

FIG. 3 presents explanatory diagrams of the phased-array flaw-detection method in accordance with the invention, the method being described by using the third embodiment illustrated in FIG. 5.

These diagrams illustrate the examples of a delay rule for focusing or tilting (changing the traveling direction) the ultrasonic beam S. The delay rule refers to a time rule for exciting each element (microtransducer).

In FIG. 3(A), FIG. 3(B) and FIG. 3(C), (a) denotes views observed from a lateral direction, and (b) denotes three-axis views.

FIG. 3(A) illustrates the delay rule for focusing a beam at a position of 30 mm just below by using the probe 10 in accordance with the present invention. The bar graph on the upper side of the transducer corresponds to delay time. In order to focus the beam at the position just below, the elements are excited in sequence from an outer ring to finally the central element. This enables the beam to be focused by making a phase adjustment at the position of a predetermined depth.

FIG. 3(B) illustrates the delay rule for tilting the traveling direction by ten degrees. The elements are excited in sequence, starting with an element on the opposite side from the side toward which a beam is to be inclined to finally an element on the side toward which the beam is to be inclined. According to the present invention, linear division is involved in addition to the ring-shaped division, and the ultrasonic beam S can be inclined by the linear division.

Meanwhile, the delay rule for focusing the ultrasonic beam S to an arbitrary depth and an arbitrary angle in accordance with the present invention is illustrated in FIG. 3(C), the delay rule being a combination of the delay rules of FIG. 3(A) and FIG. 3(B). More specifically, according to the present invention, the ring-shaped division and the linear division are combined, and the laterally symmetrical elements are simultaneously excited, thereby making it possible to freely adjust the inclination and the focusing position by a minimum number of elements.

With the configuration described above, as illustrated in FIG. 3(A), the individual ultrasonic beams S can be focused into a circle, as with the conventional annular array probes, by controlling, under the same conditions, the plurality of ultrasonic transducers 12 (the segments 15) arranged in the circular pattern.

Further, as illustrated in FIG. 3(B), the ultrasonic beams S can be led in a direction along the reference line L by providing the delay rule on the reference line and exciting the elements at the delay time at the position of the intersection point of a perpendicular line drawn from each element to the reference line. Further, a beam can be formed that is linearly focused in the direction of the reference line. More specifically, the elements of 59, 45, 33, 23, 15 and 9 on line L1, and the elements of 61, 47, 35 and 25 on line L2 illustrated in FIG. 6 are simultaneously excited. The "direction along the reference line L" can be freely set by rotating the invented probe 10 about the center O.

At this time, as illustrated in FIG. 3(C), the ultrasonic beam S traveling along the reference line L, for example, can be focused also into a circle by adding the delay rule for the direction along the L-line illustrated in FIG. 3(B) to the delay rule for focusing the beam into a circle illustrated in FIG. 3(A).

FIG. 7A is a schematic side view illustrating a case where the invented probe 10 of the second embodiment is used to inspect the test piece TP having a cylindrical external surface. Further, FIG. 7B is a sectional view taken along the Y-axis in FIG. 7A.

Further, FIG. 8 illustrates an example of angle beam flaw detection in which the probe 10 in accordance with the present invention is mounted on the wedge (the intermediate member 2) having the diagonally inclined surface, and an ultrasonic wave is made incident at an angle with respect to the axial direction of the test piece TP in contrast to FIG. 7A and FIG. 7B illustrating the ultrasonic wave vertically entering the test piece.

According to the method of the present invention, in the vertical flaw detection carried out on the test piece TP having a cylindrical external surface, as illustrated in FIG. 7A, ultrasonic waves are directed toward the center line of the cylindrical shape from the outside of the test piece TP, and the test piece TP is subjected to the flaw detection by bringing the detection surface 14 to be in contact with the test piece TP into contact with the external surface and by directing the reference line L in the circumferential direction that is orthogonal to the axial direction of the cylindrical shape.

In this example, the detection surface 14 of the invented probe 10 is a flat surface, while the external surface of the test piece TP is an arc-shaped surface. Hence, in FIG. 7B and FIG. 8, the intermediate member 2 is placed between the detection surface 14 of the invented probe 10 and the external surface of the test piece TP. The material of the intermediate member 2 is generally a resin, such as an acrylic resin.

In FIG. 7A and FIG. 7B, direct contact using water or glycerin as a contact medium may be applied without using the intermediate member 2, or a water immersion flaw detection method may be used, in which a probe and the test piece TP are set apart from each other in water when detecting flaws.

In FIG. 8, a wedge which has an inclined surface and which is made of a resin, such as an acrylic resin, is used as the intermediate member 2. The inclined surface of the wedge is installed, facing in the axial direction, and the invented probe 10 is placed on the inclined surface, the reference line L being directed in the circumferential direction that is orthogonal to the axial direction of the cylindrical shape. With this arrangement, the angle beam flaw detection in the axial direction is carried out, in which the ultrasonic waves are led to the test piece along the axial direction and the ultrasonic waves are made incident on the test piece in an oblique direction. The surface of the intermediate member 2 on the cylindrical test piece side may be a flat surface or a curved surface that matches the curvature of the cylindrical shape. Further, the description has been given of the case where the wedge is used as the intermediate member 2, and the probe in accordance with the present invention is installed on the wedge. Alternatively, however, an angle probe for a phased-array flaw detection, which combines the invented probe 10 and the wedge into one piece may be used.

Preferably, the quantity of the circular dividing lines 16a is equal to or more than seven, the quantity of the linear dividing lines 16b is equal to or more than fourteen, and the quantity of the ultrasonic transducers 12 is equal to or more than sixty-four.

According to the embodiments of the present invention described above, the plurality of ultrasonic transducers 12 are separated in the concentric circle pattern and also separated on the rows that are orthogonal to the reference line L passing through the center of the circles, and are arranged line symmetrically with respect to the reference line L. This configuration makes it possible to control the plurality of ultrasonic transducers 12 on the concentric circles under the same conditions, thus enabling the ultrasonic beams S to be focused into a circle, as with the annular array probe.

In the columnar test piece, the interface through which ultrasonic waves enter the test piece TP is circular when viewed from the section of FIG. 7B, whereas the interface is linear when observed in a side view. When the ultrasonic beam S formed inside the test piece is observed in a side view, the ultrasonic beam S can be focused in the same manner as that of a beam profile inside a flat plate. However, when observed on a section, the ultrasonic beam S is refracted at the circular test piece interface. The sonic speed of the test piece TP is usually higher than the sonic speed of the intermediate member 2, so that the ultrasonic beam S inside the test piece diffuses, resulting in a significantly different focusing position from that in the side view. This prevents the ultrasonic beam S from being focused into a circle, thus leading to the deterioration of inspection accuracy.

The probe of the present invention has the function for controlling the ultrasonic beam S in a linear manner by providing the delay rule on the straight line of the reference line L in addition to the function for focusing the ultrasonic beam S into a circle by the elements divided in a ring-shaped pattern. More specifically, by further enhancing the focusing effect in the circumferential direction to compensate for the diffusion of the beam at the circular interface on the section, the focusing of the ultrasonic beam S observed in the side view can be brought closer to the focusing also in the sectional direction, thus making it possible to obtain the effect for focusing that is close to a circle.

Further, the plurality of control channels 21 control the pairs of line symmetrical ultrasonic transducers 12 under the same conditions, so that the quantity of the ultrasonic transducers 12 along the reference line L can be increased without increasing the number of the channels of the controller 20, thus making it possible to reduce the noise level.

The following will describe the simulation results of the first to the third embodiments of the present invention in comparison with conventional examples.

First Embodiment

FIG. 9 presents the comparative diagrams of the beam profiles of a linear array probe, an annular array probe, and a matrix array probe in the case where the number of divisions is eight. In each diagram, the upper diagrams illustrate the focused states of the ultrasonic beam S in a test piece, while the lower diagrams illustrate the echo intensity (beam intensity) in the width direction at a position where the ultrasonic beam S is most focused (the maximum echo position) in the upper diagrams.

Hereinafter, the linear array probe will be abbreviated as "the linear probe," the annular array probe as "the annular probe," and the matrix array probe as "the matrix probe."

In the diagrams, regarding the size of each transducer, a square transducer of 35×35 mm is divided in the case of the linear probe and the matrix probe, and a circular transducer having a diameter of 35 mm is divided in the case of the annular probe. Further, the size of the gap 11 (the gap width) is fixed to 0.05 mm, and the focusing point is set at a position that is 100 mm deep.

FIG. 10 presents comparison diagrams illustrating the heights of echoes in the width direction in the case where the number of divisions is 4 to 32. The maximum number of divisions of the matrix probe is denoted by 8×8=64, so that only 4, 6 and 8 divisions are illustrated.

From the comparison of the beam profiles in FIG. 9 and FIG. 10, it has been found that the focusing property of the ultrasonic beam S deteriorates as the number of divisions decreases and therefore the size of each of the elements (the segments 15 described above) increases. It has been further found that, in the obtained beam profiles, beams considered to be side lobes are enhanced around the focused ultrasonic beam S to be used for measurement, causing the flaws M to be erroneously recognized as a main lobe and a side lobe or resulting in a failure of separation between the main lobe and the side lobe, resulting in the deterioration of measurement accuracy.

FIG. 11 is a diagram illustrating the relationship between the number of divisions of a transducer and the side lobe noise level at a depth of 75 mm.

This diagram illustrates the results of comparison of the beam profiles in FIG. 9 and FIG. 10.

FIG. 11 indicates that reducing the side lobe noise level to 10% or less requires four or more divisions for the annular probe, and eleven or more divisions for the linear probe. Thus, the 6-ring, 11-line division, the number of ring divisions of which is five, illustrated in FIG. 3 can reduce the side lobe noise level to 10% or less. It is also seen that a regular matrix probe of 64 (8×8) channels cannot achieve 10% or less mentioned above.

Second Embodiment

FIG. 12 is a diagram illustrating the relationship between the number of divisions of a transducer and the beam width of the ultrasonic beam S.

In this diagram, a beam width equal to or more than half a maximum sound pressure at a position where a sound pressure is most concentrated is used.

It is understood from FIG. 12 that the beam width rapidly increases as the number of divisions of a transducer decreases, resulting in the deterioration of the concentration of the ultrasonic beam S.

In addition, from the diagram, it is understood that the beam can be controlled to the range of 5% of a minimum beam width by dividing a transducer by eight rings or more in the case of an annular array or by thirteen or more divisions in the case of the linear array. In other words, the 8-ring, 15-line divisions in the second and the third embodiments of FIG. 4 and FIG. 5 can achieve the beam control.

The first and the second embodiments described above have disclosed the following.

(1) As illustrated in FIG. 2 and FIG. 4, the detection surface 14 of the invented probe 10 is preferably divided by the circular dividing lines 16a in a concentric circle pattern (including the central circle and elliptical rings) and the linear dividing lines 16b that are parallel to each other.

(2) Further, the linear dividing lines 16b, which are parallel to each other, preferably coincide with the positions of the gaps of the circular dividing lines 16a in the concentric circle pattern.

The arrangements of (1) and (2) enable the detection surface 14 to be separated in the direction that is orthogonal to the reference line L which is on the concentric circles and which passes through the center, thus making it possible to easily divide the detection surface 14 into the segments 15 positioned line symmetrically with respect to the reference line L. In this case, the size of the gap 11 between adjoining segments 15 (the gap width) can be maintained to be a fixed or approximately fixed width, thus enabling the effective use of the entire surface of the detection surface 14 except for the gaps 11.

(3) Preferably, the number of divisions by the circular dividing lines 16a is equal to or more than six, including the central circle, and the number of divisions by the linear dividing lines 16b is equal to or more than eleven.

With this arrangement, when focusing the ultrasonic beam S of the invented probe 10 into a circle, as with the annular array probe, the side lobe noise level in FIG. 11 can be suppressed to a low value of 3 to 4%.

In addition, when the invented probe 10 directs the ultrasonic beam S of the invented probe 10 in an arbitrary direction along the reference line L, the beam width of the ultrasonic beam S in FIG. 12 can be suppressed to a low value of 4.3 to 4.4 mm, as with the linear array probe.

(4) The pairs of ultrasonic transducers 12 that are positioned line symmetrically with respect to the reference line L passing through the center O of the circles are preferably excited at the same time.

(5) In the case where the invented probe 10 is used for a thick-wall column or pipe, the flaw detection is preferably carried out by setting the direction of the reference line L (the Y-axis) in the direction that is orthogonal to the axial direction of the column or the pipe.

With the arrangements of (4) and (5), the profile of the beam incident on a test piece observed from the sectional direction can be brought close to the same profile of beam as that of a smooth surface observed in a side view by correcting the influence of a circular interface when the ultrasonic beam enters the test piece, thus enabling the flaw detection accuracy to be improved.

(6) In this case, preferably, the number of divisions by the circular dividing lines 16a is set to eight, the number of divisions by the linear dividing lines 16b is set to fifteen, and the pairs of segments 15 positioned line symmetrically with respect to the reference line L are controlled by the same control channel 21.

Simultaneously exciting the ultrasonic transducers 12 that are line symmetrical with respect to the reference line L makes it possible to control, by 64 control channels 21, the 113 segments 15 divided by the circular dividing lines 16a and the linear dividing lines 16b. This enables the beam focusing effect to be within 5% of an optimum beam width.

Third Embodiment

FIG. 13 presents comparison diagrams illustrating the beam profiles of a matrix probe and the first and the second embodiments of the invented probe 10.

Diagram (A) illustrates a matrix probe obtained by dividing a square transducer of 35×35 mm into 8 columns and 8 rows. Diagram (B) illustrates the invented probe 10 obtained by dividing a circular transducer having a diameter of 35 mm by six rings and eleven lines (the first embodiment). Diagram (C) illustrates the invented probe 10 obtained by dividing a circular transducer having a diameter of 35 mm by eight rings and fifteen lines (the second embodiment).

Further, diagram (a) illustrates the case where the longitudinal wave refraction angle is set to 5.7 degrees, the depth is set to 100 mm, and the distance is set to 10 mm; and (b) illustrates the case where the longitudinal wave refraction angle is set to 11.3 degrees, the depth is set to 100 mm, and the distance is set to 20 mm.

FIG. 14 is a diagram illustrating the relationship between the echo levels at end portions and beam widths obtained from FIG. 13.

It is seen from this diagram that the beam widths of the invented probes 10 of the first and the second embodiments are smaller than the beam width in the conventional method (the matrix probe).

FIG. 15 presents comparison diagrams of the flaw detection test results of a linear probe, a matrix probe, and the invented probe 10 in the case where there are a flat-plate flaw of 20×20 mm and a spherical flaw having a diameter of 3 mm at a position that is 70 mm deep.

From the diagrams, it is seen that the flat-plate flaw and the spherical flaw can be detected by the invented probe 10 at higher accuracy in comparison with the linear probe and the matrix probe.

FIG. 16 presents comparison diagrams of the flaw detection test results of the invented probe 10, an annular probe, and a matrix probe, the flaw detection test having been conducted on a test piece TP which has a cylindrical external surface.

Among the diagrams, (A) illustrates the third embodiment of the invented probe 10 having 8 division rings and 113 divided arc-shaped elements, (B) illustrates an annular probe of 32 divisions, and (C) illustrates a matrix probe of 8×8 divisions.

Further, in each of the diagrams, (a) illustrates the sections in the axial direction, and (b) illustrates the sections in the direction that is orthogonal to the axis.

From the diagrams, it is seen that, as compared with the annular probe and the matrix probe, the invented probe 10 can focus the beam in both the section in the axial direction and the section in the direction that is orthogonal to the axis, thus making it possible to detect flaws with higher accuracy.

In particular, the annular array probe uses a circularly divided transducer, so that the beam focusing property in the section that is orthogonal by 90 degrees on a smooth surface remains the same. However, in the case of the present test conducted on the columnar test piece, it is seen that the beam is significantly diffused and not focused at a circular curvature at the interface on which the beam is incident especially in the section that is orthogonal to the axis, thus markedly impairing the measurement accuracy. In contrast, according to the flaw detection of the present invention, the division corresponding to the curvature especially in the circumferential direction is performed in rows in the direction that is orthogonal to the reference line, and the delay rule is provided in the direction of the reference line thereby to compensate for the influence of the curvature. Thus, it is seen that successful focusing is accomplished in both the section in the axial direction and the section in the direction that is orthogonal to the axis, so that the beam can be focused into a circle and therefore the inspection accuracy can be significantly improved.

The device in accordance with the present invention described above was fabricated and tested.

Fourth Embodiment (Invented probe 10 that has been fabricated)
Table 1 illustrates the specifications of the invented probe 10 that has been fabricated.

TABLE 1

| | |
|---|---|
| External Dimensions | diameter: 54 mm; Length: 35 mm |
| Material of housing | SUS |
| Frequency | 5 MHz |
| Material of transducer | composite |
| Diameter of transducer (D) | 34.4 mm |
| Total number of elements | 8 rings × 15 lines = 113 elements |
| Number of channels | 64 channels (laterally symmetrical elements are short-circuited) |
| 1-channel element width (b) | 2.2 mm |
| Pitch | 2.3 mm |
| Gap (G) | 0.1 mm |

FIG. 17 presents the outline drawings of the invented probe 10 that has been fabricated, wherein (A) is a top view, (B) is a side view, and (C) is a bottom view.

FIG. 18 is a layout diagram of the ultrasonic transducers 12 of the invented probe 10 that has been fabricated.

In this drawing, the layout of the ultrasonic transducers 12 is the same as that illustrated in FIG. 4, which is "the 8-ring, 15-line division." Further, a diameter D of the detection surface 14 is 34.4 mm, a width "b" of the segment 15 is 2.2 mm, and the size of the gap 11 (a gap width G) is 0.1 mm.

(Test Conditions)
FIG. 19A is an explanatory diagram illustrating the test conditions of the invented probe 10 that has been fabricated.

A test piece TP used for the test is a steel block having a width (W=100 mm), a length (L=160 mm), and a height (H=120 mm). The bottom surface of the test piece TP was provided with a 45-degree inclined surface opposing the upper surface (a test piece surface 1) of the test piece TP, and simulated defects (flaws M) were added to the center of the inclined surface.

FIG. 19B is an explanatory diagram of the flaws M. The flaws M included nine round holes, each of which has a 1-mm diameter and which are arranged at 5-mm pitches in a cross shape, in a circle which is indicated by the dashed line and which has a 30-mm diameter. Hereinafter, the flat inclined surface 3 having the flaws M will be referred to as "the defective plane 3."

Referring to FIG. 19A, the invented probe 10 was attached to a wedge 2 having a 45-degree transverse wave angle of refraction, and the flaw detection test was conducted through the test piece surface 1. At this time, the scanning direction was set in the direction that is orthogonal to the paper surface of FIG. 19A (the width direction).

Further, as a comparative example, the same flaw detection test was conducted using a 32-channel linear array probe (a conventional probe).

(Test Results)
FIG. 20 presents C-scan images on the defective plane, wherein (A) illustrates an image of the invented probe 10, and (B) illustrates an image of the conventional probe. The C-scan images mean the images projected from above.

Referring to FIG. 20, the axis of abscissas denotes a scan distance (mm), and the axis of ordinates denotes the angle of deflection (Angle: °). In this test, the focus position was changed in the longitudinal direction when carrying out the ultrasonic flaw detection, and the angle of deflection was set to the range of ±7.5°, the center being 0°.

From FIG. 20, it is seen that, as compared with the image of the conventional probe, the image of the invented probe 10 clearly detects the simulated flaws.

FIG. 21 presents peak diagrams in a scanning direction, and FIG. 22 presents peak diagrams in a direction that is orthogonal to the scanning direction (the lateral direction in FIG. 19A). In FIG. 21 and FIG. 22, (A) illustrates an image of the invented probe 10, and (B) illustrates an image of the conventional probe.

Referring to FIG. 21, the axis of abscissas denotes the scan distance (mm), and the axis of ordinates denotes a beam intensity (%). Referring to FIG. 22, the axis of abscissas denotes the angle of deflection (°), and the axis of ordinates denotes the beam intensity (%). The maximum value of the beam intensity is set to 100%.

From FIG. 21 and FIG. 22 also, it is seen that, in comparison with the images of the conventional probe, the images of the invented probe 10 detect the simulated flaws with higher accuracy.

It is needless to mention that the present invention is not limited to the embodiments described above, and can be changed in a variety of manners within a range that does not deviate from the spirit of the present invention.

REFERENCE SIGNS LIST

A: split electrode; B: excitation region; C: common electrode; D: Size of transducer to be divided (diameter of detection surface); I: segment number; L: reference line; M: flaw; O: center; S: ultrasonic beam; TP: test piece; x: depth; 1: test piece surface; 2: intermediate member (wedge); 3: defective plane; 8a: groove; 8b: gap; 9: piezoelectric element; 10: phased-array probe (probe, invented probe); 11: gap; 12: ultrasonic transducer; 14: detection surface; 15: segment; 16: dividing line; 16a: circular dividing line; 16b: linear dividing line; 20: controller; 21: control channel; 22: display unit; 24: image processing unit; and 100: phased-array flaw-detection device.

The invention claimed is:
1. A phased-array flaw-detection device comprising:
a phased-array probe having a plurality of ultrasonic transducers which are separated in a concentric circle pattern, separated in rows that are orthogonal to a reference line that passes through the center of circles, and positioned line symmetrically with respect to the reference line; and
a controller which has a plurality of control channels,
wherein the controller is configured to simultaneously excite pairs of the ultrasonic transducers that are line symmetrical with respect to the reference line at the same phase.

2. The phased-array flaw-detection device according to claim 1,
wherein the phased-array probe has a circular detection surface for transmitting and receiving an ultrasonic beam, and
the detection surface has a plurality of segments divided into a plurality of arc-shaped portions that are symmetrical with respect to the reference line.

3. The phased-array flaw-detection device according to claim 2,
wherein dividing lines of the segments are composed of a plurality of concentric circular dividing lines that divide the circle into a plurality of annular portions, and a plurality of linear dividing lines which divide the annular portions into the arc-shaped portions and which are parallel to each other.

4. The phased-array flaw-detection device according to claim 3, wherein the linear dividing lines are orthogonal to the reference line passing through the center and are in contact with at least two points on the circumference of the circular dividing lines.

5. The phased-array flaw-detection device according to claim 3, wherein the number of the circular dividing lines is equal to or more than five.

6. A phased-array flaw-detection method using the phased-array flaw-detection device according to claim 1,
wherein pairs of the ultrasonic transducers that are line symmetrical with respect to the reference line are controlled under the same conditions.

7. The phased-array flaw-detection method according to claim 6, wherein, in vertical flaw detection carried out on a test piece, which has a cylindrical external surface, toward a centerline of the cylindrical shape from outside the test piece, and angle beam flaw detection in an axial direction, the reference line is directed in a circumferential direction that is orthogonal to the axial direction of the cylindrical shape to carry out flaw detection inspection on the test piece.

8. The phased-array flaw-detection method according to claim 6, wherein the number of circular dividing lines is equal to or more than seven, the number of linear dividing lines is equal to or more than fourteen, and the number of the ultrasonic transducers is equal to or more than sixty-four.

* * * * *